(12) United States Patent
Pugh et al.

(10) Patent No.: US 9,366,881 B2
(45) Date of Patent: *Jun. 14, 2016

(54) METHOD AND APPARATUS FOR OPHTHALMIC DEVICES INCLUDING SHAPED LIQUID CRYSTAL POLYMER NETWORKED REGIONS OF LIQUID CRYSTAL

(71) Applicant: Johnson & Johnson Vision Care, Inc., Jacksonville, FL (US)

(72) Inventors: Randall Braxton Pugh, St. Johns, FL (US); Frederick A. Flitsch, New Windsor, NY (US); Adam Toner, Jacksonville, FL (US); James Daniel Riall, St. Johns, FL (US); Praveen Pandojirao-S, Jacksonville, FL (US); Nelson V. Tabirian, Winter Park, FL (US); Svetlana Serak, Oviedo, FL (US); Olena Uskova, Winter Park, FL (US); Luciano De Sio, Winter Park, FL (US)

(73) Assignee: Johnson & Johnson Vision Care, Inc., Jacksonville, FL (US)

(*) Notice: Subject to any disclaimer, the term of this patent is extended or adjusted under 35 U.S.C. 154(b) by 54 days.

This patent is subject to a terminal disclaimer.

(21) Appl. No.: 14/306,519
(22) Filed: Jun. 17, 2014
(65) Prior Publication Data US 2015/0077661 A1 Mar. 19, 2015

Related U.S. Application Data

(60) Provisional application No. 61/878,723, filed on Sep. 17, 2013.

(51) Int. Cl.
*G02F 1/1335* (2006.01)
*G02F 1/1333* (2006.01)
(Continued)

(52) U.S. Cl.
CPC ..... *G02C 7/041* (2013.01); *G02C 7/04* (2013.01); *G02C 7/049* (2013.01); *G02C 7/083* (2013.01); *G02F 1/1313* (2013.01); *G02F 1/13718* (2013.01)

(58) Field of Classification Search
CPC .......... G02F 1/133377; G02F 1/133512; G02F 1/133325; G02F 1/1334; G02F 2001/13775; G02C 7/101; G02B 27/0172; G02B 2027/0178; G02B 2027/0132; G02B 5/30; C09K 19/544
USPC .............................. 349/13, 84, 88
See application file for complete search history.

(56) References Cited

U.S. PATENT DOCUMENTS 5,682,210 A  10/1997  Weirich
6,120,460 A   9/2000  Abreu
(Continued)

FOREIGN PATENT DOCUMENTS

EP  1947501 A2  7/2008
EP  2063311 A1  5/2009
(Continued)

OTHER PUBLICATIONS

Milton, Harry E. et al., "Electronic Liquid Crystal Contact Lenses for the Correction of Presbyopia", Optics Express, Apr. 7, 2014, vol. 22, No. 7.
(Continued)

*Primary Examiner* — Mike Qi

(57) ABSTRACT

The present invention relates to methods and apparatus for providing a variable optic insert into an ophthalmic lens. The variable optic insert may have surfaces within that have differing radii of curvature. A liquid crystal layer may be used to provide a variable optic function and in some embodiments, the liquid crystal layer may comprise polymer networked regions of interstitially located liquid crystal material. An energy source is capable of powering the variable optic insert included within the ophthalmic lens. In some embodiments, an ophthalmic lens is cast-molded from a silicone hydrogel. The various ophthalmic lens entities may include electroactive liquid crystal layers to electrically control refractive characteristics.

40 Claims, 11 Drawing Sheets

(51) Int. Cl.
*G02C 7/04* (2006.01)
*G02C 7/08* (2006.01)
*G02F 1/13* (2006.01)
*G02F 1/137* (2006.01)

(56) References Cited

U.S. PATENT DOCUMENTS

| | | | |
|---|---|---|---|
| 6,312,393 B1 | 11/2001 | Abreu | |
| 6,570,386 B2 | 5/2003 | Goldstein | |
| 7,018,040 B2 * | 3/2006 | Blum | B29D 11/00826 351/159.03 |
| 7,169,106 B2 | 1/2007 | Fleischman et al. | |
| 7,626,562 B2 | 12/2009 | Iwasaki | |
| 7,708,401 B2 | 5/2010 | Sabeta | |
| 7,931,832 B2 * | 4/2011 | Pugh | B29D 11/00125 264/1.32 |
| 2004/0021929 A1 | 2/2004 | Nishioka | |
| 2005/0062679 A1 | 3/2005 | Aharoni et al. | |
| 2005/0151926 A1 | 7/2005 | Kumar | |
| 2008/0208335 A1 * | 8/2008 | Blum | A61F 2/1616 623/6.22 |
| 2008/0278675 A1 | 11/2008 | Escuti | |
| 2009/0076367 A1 | 3/2009 | Sit et al. | |
| 2009/0316097 A1 * | 12/2009 | Presniakov | G02F 1/29 349/129 |
| 2010/0001926 A1 | 1/2010 | Amirparviz et al. | |
| 2010/0103368 A1 | 4/2010 | Amirparviz et al. | |
| 2011/0028807 A1 | 2/2011 | Abreu | |
| 2011/0184271 A1 | 7/2011 | Veciana et al. | |
| 2011/0188120 A1 | 8/2011 | Tabirian | |
| 2011/0262844 A1 | 10/2011 | Tabirian | |
| 2012/0212696 A1 | 8/2012 | Trajkovska | |
| 2012/0229754 A1 | 9/2012 | Iyer | |
| 2013/0050639 A1 | 2/2013 | Trajkovska | |
| 2013/0166025 A1 * | 6/2013 | Pugh | G02C 7/049 623/6.22 |
| 2013/0245754 A1 | 9/2013 | Blum | |
| 2014/0036172 A1 | 2/2014 | Trajkovska-Broach et al. | |
| 2014/0132904 A1 | 5/2014 | Bos et al. | |
| 2014/0327875 A1 * | 11/2014 | Blum | A61F 2/1618 351/159.03 |
| 2015/0077662 A1 * | 3/2015 | Pugh | G02C 7/04 349/13 |

FOREIGN PATENT DOCUMENTS

| | | |
|---|---|---|
| EP | 2431790 A1 | 3/2012 |
| WO | WO0049452 A1 | 8/2000 |
| WO | WO2008/091859 A1 | 7/2008 |
| WO | WO2012103497 A1 | 8/2012 |
| WO | WO2012122411 A1 | 9/2012 |
| WO | WO2013096781 A1 | 6/2013 |
| WO | WO2013113278 A1 | 8/2013 |

OTHER PUBLICATIONS

Chen, Yuan et al., "High Performance Negative Dielectric Anistrophy Liquid Crystals for Display Applications", Crystals, 2013, 3, 483-503.

Syed, Ishtiaque M. et al., "Novel Switching Mode in a Vertically Aligned Liquid Crystal Contact Lens", Optics Express, Apr. 20, 2015, vol. 23, No. 8.

Asatryan, K., et al., "Optical Lens With Electrically Variable Focus Using an Optically Hidden Dielectric Structure", Optics Express, vol. 18, No. 13, pp. 13981-13992 (2010).

Hoogboom, J., et al., "LCD Alignment Layers, Controlling Nematic Domain Properties", Journal of Material Chemistry, vol. 16, pp. 1305-1314 (2006).

Laude, Vincent "Twisted-Nematic Liquid-Crystal Pixelated Active Lens", Optics Communications, vol. 153, pp. 134-152 (1998).

Birefringence in Liquid Crystals, http://plc.cwru.edu/tutorial/enhanced/files/lc/biref/biref.htm, pp. 1-4 Dec. 10, 2012.

Ren Hongwen et al., "Tunable Fresnel Lens Using Nanoscale Polymer-Dispersed Liquid Crystals", Applied Physics Letters, American Institute of Physics, vol. 83, No. 8, Aug. 25, 2003, pp. 1515-1517.

Nersisyan S. R. et al., "The Principals of Laser Beam Control with Polarization Gratings Introduced as Diifractive Waeplates", Proceedings of Spie, SPIE International Society for Optical Engineering, vol. 7775, Aug. 1, 2010, pp. 77750.

L. Marrucci, et al., "Pancharatnam-Berry phase optical elements for wave front shaping in the visible domain: Switchable helical mode generation", Applied Physics Letters 88, 221102-1, 2006.

Ervin Goldfain, "exact Raytracing Formulae for Parabolic Axial Grin Lenses", Gradient Index, Miniature, and Diffractive Optical Systems, vol. 3778, pp. 2-10.

* cited by examiner

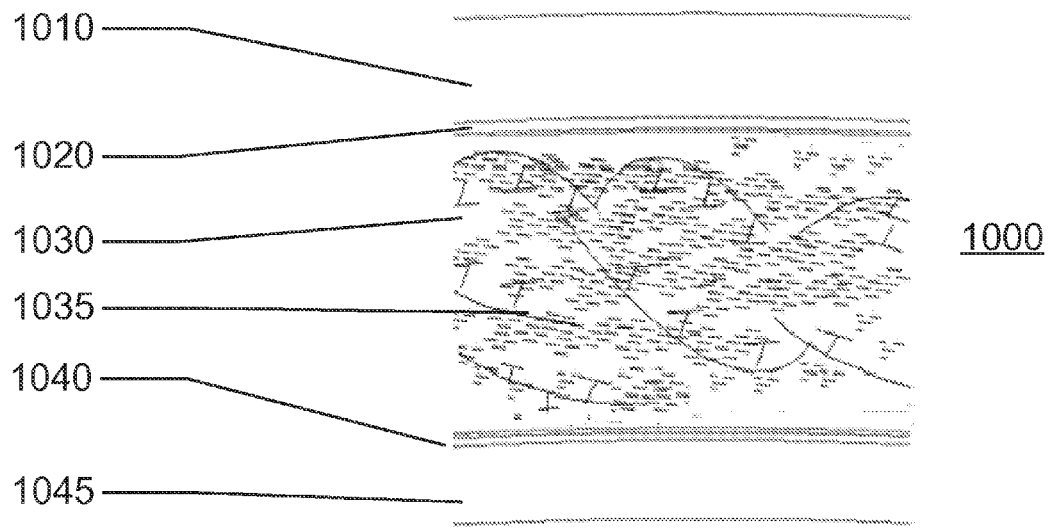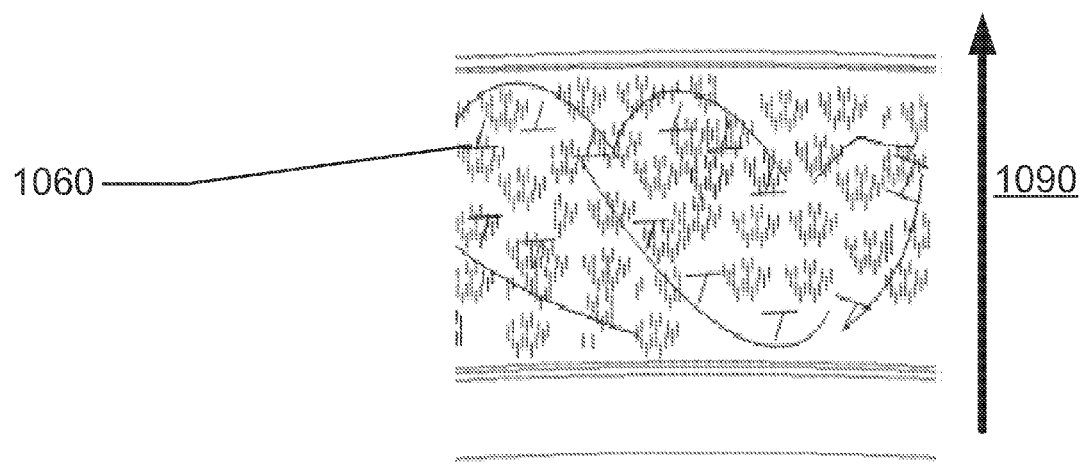

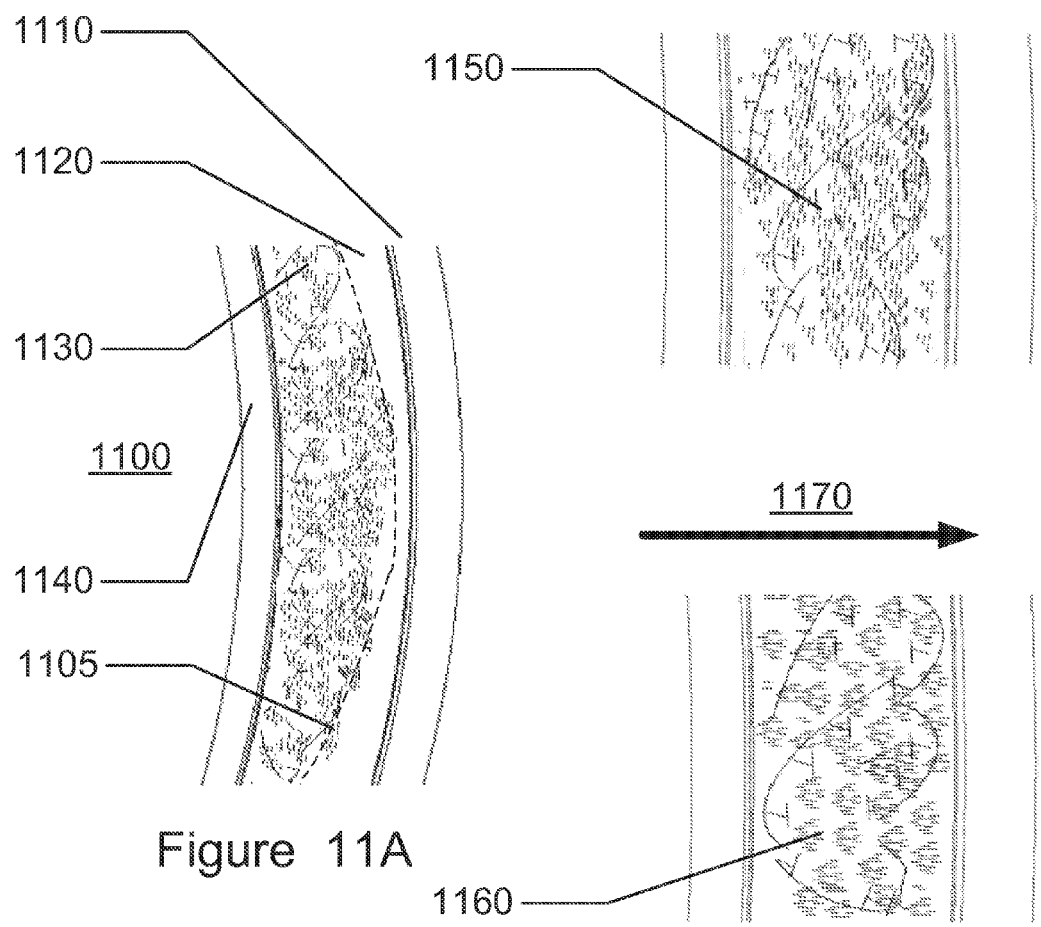

METHOD AND APPARATUS FOR OPHTHALMIC DEVICES INCLUDING SHAPED LIQUID CRYSTAL POLYMER NETWORKED REGIONS OF LIQUID CRYSTAL

CROSS REFERENCE TO RELATED APPLICATIONS

This patent application claims the benefit of U.S. Provisional Application No. 61/878,723, filed Sep. 17, 2013.

BACKGROUND OF THE INVENTION

1. Field of the Invention

The present invention relates to an ophthalmic lens device with a variable optic capability and, more specifically, in some embodiments, the fabrication of an ophthalmic lens with a variable optic insert utilizing liquid crystal elements.

2. Discussion of the Related Art

Traditionally an ophthalmic lens, such as a contact lens or an intraocular lens provided a predetermined optical quality. A contact lens, for example, may provide one or more of the following: vision correcting functionality; cosmetic enhancement; and therapeutic effects, but only a set of vision correction functions. Each function is provided by a physical characteristic of the lens. Basically, a design incorporating a refractive quality into a lens provides vision corrective functionality. A pigment incorporated into the lens may provide a cosmetic enhancement. An active agent incorporated into a lens may provide a therapeutic functionality.

To date optical quality in an ophthalmic lens has been designed into the physical characteristic of the lens. Generally, an optical design has been determined and then imparted into the lens during fabrication of the lens, for example, through cast molding, or lathing. The optical qualities of the lens have remained static once the lens has been formed. However, wearers may at times find it beneficial to have more than one focal power available to them in order to provide sight accommodation. Unlike spectacle wearers, who may change spectacles to change an optical correction, contact wearers or those with intraocular lenses have not been able to change the optical characteristics of their vision correction without significant effort or the complementing of spectacles with contact lenses or intraocular lenses.

SUMMARY OF THE INVENTION

Accordingly, the present invention includes innovations relating to a variable optic insert with liquid crystal elements that may be energized and incorporated into an ophthalmic device, which is capable of changing the optical quality of the device. Examples of such ophthalmic devices may include a contact lens or an intraocular lens. In addition, methods and apparatus for forming an ophthalmic lens with a variable optic insert with liquid crystal elements are presented. Some embodiments may also include a cast-molded silicone hydrogel contact lens with a rigid or formable energized insert, which additionally includes a variable optic portion, wherein the insert is included within the ophthalmic lens in a biocompatible fashion.

The description of the present invention therefore includes disclosure of an ophthalmic lens with a variable optic insert, apparatus for forming an ophthalmic lens with a variable optic insert, and methods for manufacturing the same. An energy source may be deposited or assembled onto a variable optic insert and the insert may be placed in proximity to one, or both of, a first mold part and a second mold part. A composition comprising a reactive monomer mixture (hereafter referred to as a reactive monomer mixture) is placed between the first mold part and the second mold part. The first mold part is positioned proximate to the second mold part thereby forming a lens cavity with the energized media insert and at least some of the reactive monomer mixture in the lens cavity; the reactive monomer mixture is exposed to actinic radiation to form an ophthalmic lens. Lenses are formed via the control of actinic radiation to which the reactive monomer mixture is exposed. In some embodiments, an ophthalmic lens skirt or an insert-encapsulating layer comprises standard hydrogel ophthalmic lens formulations. Exemplary materials with characteristics that may provide an acceptable match to numerous insert materials may include, for example, the Narafilcon family (including Narafilcon A and Narafilcon B), the Etafilcon family (including Etafilcon A), Galyfilcon A and Senofilcon A.

The methods of forming the variable optic insert with liquid crystal elements and the resulting inserts are important aspects of various exemplary embodiments of the invention. In some embodiments, the liquid crystal may be located between two alignment layers, which may set the resting orientation for the liquid crystal. Those two alignment layers may be in electrical communication with an energy source through electrodes deposited on substrate layers that contain the variable optic portion. The electrodes may be energized through an intermediate interconnect to an energy source or directly through components embedded in the insert.

The energization of the electrode layers may cause a shift in the liquid crystal from a resting orientation to an energized orientation. In exemplary embodiments that operate with two levels of energization, on or off, the liquid crystal may only have one energized orientation. In other alternative exemplary embodiments, where energization occurs along a scale of energy levels, the liquid crystal may have multiple energized orientations. Still further exemplary embodiments may derive where the energization process may cause a switch between different states through an energization pulse.

The resulting alignment and orientation of the molecules may affect light that passes through the liquid crystal layer thereby causing the variation in the variable optic insert. For example, the alignment and orientation may act with refractive characteristics upon the incident light. Additionally, the effect may include an alteration of the polarization of the light. Some exemplary embodiments may include a variable optic insert wherein energization alters a focal characteristic of the lens.

In some exemplary embodiments, the liquid crystal layer may be formed in a manner wherein a polymerizable mixture comprising liquid crystal molecules is caused to polymerize. The monomer(s) used to form the polymer matrix may itself contain attached liquid crystal portions. By controlling the polymerization and including liquid crystal molecules unattached to the monomer compounds a matrix of cross-linked polymer regions may be formed that encompass regions where the individual liquid crystal molecules are located. In some terminology, such a combination of cross-linked polymerized molecules with interstitial included liquid crystal molecules may be called a network arrangement. Alignment layers may guide alignment of the liquid crystal molecules which are attached to monomer such that the network of polymerized material is aligned to the guiding alignment layers. The attached liquid crystal molecules are locked into an orientation during the polymerization, however the interstitially located liquid crystal molecules may be free to orient in space. When no external influence is present, the free liquid crystal molecules will have their alignment influenced by the matrix of aligned liquid crystal molecules.

Accordingly, in some exemplary embodiments, an ophthalmic device may be formed by the incorporation of a variable optic insert comprising liquid crystal molecules within an ophthalmic device. The variable insert may comprise at least a portion which may be located in the optic zone of the ophthalmic device. The variable insert may comprise a front insert piece and a back insert piece. The front and back insert pieces may have either or both of their surfaces curved in various manners, and in some exemplary embodiments the radius of curvature of a back surface on the front insert piece may be different from the radius of curvature of the front surface of the back insert piece. In an alternative manner of description, in some exemplary embodiments, the front insert piece may have a surface with a first curvature, and the back insert piece may have a second surface with a second curvature. In some embodiments the first curvature may be different from the second curvature. An energy source may be included into the lens and into the insert, and in some exemplary embodiments the energy source may be located wherein at least a portion of the energy source is in the non-optic zone of the device.

In some exemplary embodiments the layer comprising polymer networked regions of interstitially located liquid crystal material may be further defined such that within the layer comprised of interstitial liquid crystal material the region comprising the liquid crystal is a subset of the polymerized layers and has a shaped profile capable of causing an optical effect supplementary to the effect of the different radii of insert surfaces.

In some exemplary embodiments the layer comprising polymer networked regions of interstitially located liquid crystal material may be further defined such that within the layer the density of liquid crystal molecules is spatially varied such that the variation is capable of causing an optical effect supplementary to the effect of the different radii of insert surfaces.

In some exemplary embodiments the ophthalmic device may be a contact lens.

In some embodiments the insert of the ophthalmic device may comprise electrodes made of various materials, including transparent materials such as indium tin oxide (ITO) as a non-limiting example. A first electrode may be located proximate to a back surface of a front curve piece, and a second electrode may be located proximate to a front surface of a back curve piece. When an electric potential is applied across the first and second electrodes, an electric field may be established across a liquid crystal layer located between the electrodes. The application of an electric field across the liquid crystal layer may cause free liquid crystal molecules within the layer to physically align with the electric field. In some exemplary embodiments, the free liquid crystal molecules may be located in interstitial regions within a network of polymer and in some exemplary embodiments the polymer backbone may comprise chemically bound liquid crystal molecules which may be aligned during polymerization by alignment layers. When the liquid crystal molecules align with the electric field, the alignment may cause a change in the optical characteristics that a light ray may perceive as it traverses the layer containing liquid crystal molecules. A non-limiting example may be that the index of refraction may be altered by the change in alignment. In some exemplary embodiments, the change in optical characteristics may result in a change in focal characteristics of the lens which contains the layer containing liquid crystal molecules.

In some exemplary embodiments, the ophthalmic devices as described may include a processor.

In some exemplary embodiments, the ophthalmic devices as described may include an electrical circuit. The electrical circuit may control or direct electric current to flow within the ophthalmic device. The electrical circuit may control electrical current to flow from an energy source to the first and second electrode elements.

The insert device may comprise more than a front insert piece and a back insert piece in some exemplary embodiments. An intermediate piece or pieces may be located between the front insert piece and the back insert piece. In an example, a liquid crystal containing layer may be located between the front insert piece and the intermediate piece. The variable insert may comprise at least a portion which may be located in the optic zone of the ophthalmic device. The front, intermediate and back insert piece may have either or both of their surfaces curved in various manners, and in some exemplary embodiments the radius of curvature of a back surface on the front insert piece may be different from the radius of curvature of the front surface of the intermediate insert piece. An energy source may be included into the lens and into the insert, and in some embodiments the energy source may be located wherein at least a portion of the energy source is in the non-optic zone of the device.

The insert with a front insert piece, a back insert piece and at least a first intermediate insert piece may comprise at least a first liquid crystal molecule, and the liquid crystal molecule or molecules may also be found in polymer networked regions of interstitially located liquid crystal molecules.

In some exemplary embodiments with a front insert piece, a back insert piece and at least a first intermediate insert piece the ophthalmic device may be a contact lens.

In some exemplary embodiments the insert of the ophthalmic device with a front insert piece, a back insert piece and at least a first intermediate insert piece may comprise electrodes made of various materials, including transparent materials such as ITO as a non-limiting example. A first electrode may be located proximate to a back surface of a front curve piece, and a second electrode may be located proximate to a front surface of an intermediate piece. In some exemplary embodiments, the front insert piece may have a surface with a first curvature, and the intermediate insert piece may have a second surface with a second curvature. In some exemplary embodiments the first curvature may be different from the second curvature. When an electric potential is applied across the first and second electrodes, an electric field may be established across a liquid crystal layer located between the electrodes. The application of an electric field across the liquid crystal layer may cause liquid crystal molecules within the layer to physically align with the electric field. In some exemplary embodiments, the liquid crystal molecules may be located in polymer networked regions of interstitially located liquid crystal material. When the liquid crystal molecules align with the electric filed, the alignment may cause a change in the optical characteristics that a light ray may perceive as it traverses the layer containing liquid crystal molecules. A non-limiting example may be that the index of refraction may be altered by the change in alignment. In some exemplary embodiments, the change in optical characteristics may result in a change in focal characteristics of the lens which contains the layer containing liquid crystal molecules.

In some exemplary embodiments the intermediate piece may comprise multiple pieces that are joined together.

In some exemplary embodiments where the insert device may be comprised of a front insert piece, a back insert piece and an intermediate piece or pieces, a liquid crystal containing layer may be located between the front insert piece and the intermediate piece or between the intermediate piece and the back insert piece. In addition, a polarizing element may be located within the variable insert device as well. The variable insert may comprise at least a portion which may be located in the optic zone of the ophthalmic device. The front, intermediate and back insert pieces may have either or both of their surfaces curved in various manners, and in some exemplary embodiments the radius of curvature of a back surface on the front insert piece may be different from the radius of curvature of the front surface of the intermediate insert piece. An energy source may be included into the lens and into the insert and in some exemplary embodiments the energy source may be located wherein at least a portion of the energy source is in the non-optic zone of the device.

In some exemplary embodiments it may be possible to reference surfaces within the variable optic insert rather than pieces. In some exemplary embodiments, an ophthalmic lens device may be formed where a variable optic insert may be positioned within the ophthalmic lens device where at least a portion of the variable optic insert may be positioned in the optical zone of the lens device. These exemplary embodiments may include a curved front surface and a curved back surface. In some exemplary embodiments the front surface and the back surface may be configured to form at least a first chamber. The ophthalmic lens device may also include an energy source embedded in the insert in at least a region comprising a non-optical zone. The ophthalmic lens device may also include a layer containing liquid crystal material positioned within the chamber, wherein the layer is comprised of polymer networked regions of interstitially located liquid crystal material.

In some exemplary embodiments a contact lens device may be formed where a variable optic insert may be positioned within the ophthalmic lens device where at least a portion of the variable optic insert may be positioned in the optical zone of the lens device. These exemplary embodiments may include a curved front surface and a curved back surface. In some exemplary embodiments the front surface and the back surface may be configured to form at least a first chamber. The contact lens device may also include a layer containing liquid crystal material positioned within the chamber, wherein the layer is comprised of polymer networked regions of interstitially located liquid crystal material.

In some exemplary embodiments a contact lens device may be formed where a variable optic insert may be positioned within the ophthalmic lens device where at least a portion of the variable optic insert may be positioned in the optical zone of the lens device. The contact lens device may also include a layer containing liquid crystal material positioned within the chamber, wherein the layer may be comprised of polymer networked regions of interstitially located liquid crystal material, and wherein at least a first surface of the layer may be curved.

In some exemplary embodiments an ophthalmic lens device may be formed where a variable optic insert may be positioned within the ophthalmic lens device where at least a portion of the variable optic insert may be positioned in the optical zone of the lens device. These exemplary embodiments may include a curved front surface and a curved back surface. In some exemplary embodiments a first curved front surface and a first curved back surface may be configured to form at least a first chamber. A second curved front surface and a second curved back surface may be configured to form at least a second chamber. The ophthalmic lens device may also include a layer containing liquid crystal material positioned within the first chamber, wherein the layer is comprised of polymer networked regions of interstitially located liquid crystal material. The ophthalmic lens device may also include an energy source embedded in the insert in at least a region comprising a non-optical zone. In some embodiments the ophthalmic lens may be a contact lens.

In some exemplary embodiments a contact lens device may be formed where a variable optic insert may be positioned within the ophthalmic lens device where at least a portion of the variable optic insert may be positioned in the optical zone of the lens device. The contact lens may include a curved first front surface and a curved first back surface wherein the first front surface and the first back surface are configured to form at least a first chamber. The contact lens may also include a first layer of electrode material proximate to the back surface of the curved first front surface. The contact lens may also comprise a second layer of electrode material proximate to the front surface of the first back curve piece. The contact lens may also include a first layer containing liquid crystal material positioned within the first chamber, wherein the first layer is comprised of polymer networked regions of interstitially located liquid crystal material, wherein the polymer network comprises chemically attached liquid crystal molecules, and wherein the first layer of liquid crystal material varies its index of refraction affecting a ray of light traversing the first layer of liquid crystal material when an electric potential is applied across the first layer of electrode material and the second layer of electrode material. The contact lens device may additionally include a curved second front surface and a curved second back surface wherein the second front surface and the second back surface are configured to form at least a second chamber. The contact lens device may also comprise a third layer of electrode material proximate to the back surface of the curved second front surface, and a fourth layer of electrode material proximate to the front surface of the second back curve piece. A second layer containing liquid crystal material positioned within the second chamber may also be included wherein the second layer is comprised of polymer networked regions of interstitially located liquid crystal material, wherein the polymer network comprises chemically attached liquid crystal molecules, and wherein the second layer of liquid crystal material varies its index of refraction affecting a ray of light traversing the first layer of liquid crystal material when an electric potential is applied across the third layer of electrode material and the forth layer of electrode material. The contact lens may also include an energy source embedded in the insert in at least a region comprising a non-optical zone. The contact lens may also include an electrical circuit comprising a processor, wherein the electrical circuit controls the flow of electrical energy from the energy source to one or more of the first, second, third or fourth electrode layers. And, the contact lens' variable optic insert may also alter a focal characteristic of the ophthalmic lens.

BRIEF DESCRIPTION OF THE DRAWINGS

The foregoing and other features and advantages of the invention will be apparent from the following, more particular description of preferred embodiments of the invention, as illustrated in the accompanying drawings.

FIGS. 10A and 10B illustrate an exemplary embodiment of an ophthalmic device comprising an insert wherein the variable optic portions may be comprised of shaped regions of polymer networked regions of interstitially located liquid crystal.

FIGS. 11A, 11B, and 11C illustrate an alternative exemplary embodiment of a variable optic lens comprising an insert wherein the variable optic portions may be comprised of varied density of polymer networked regions of interstitially located liquid crystal.

DETAILED DESCRIPTION OF THE PREFERRED EMBODIMENTS

Figure 1:
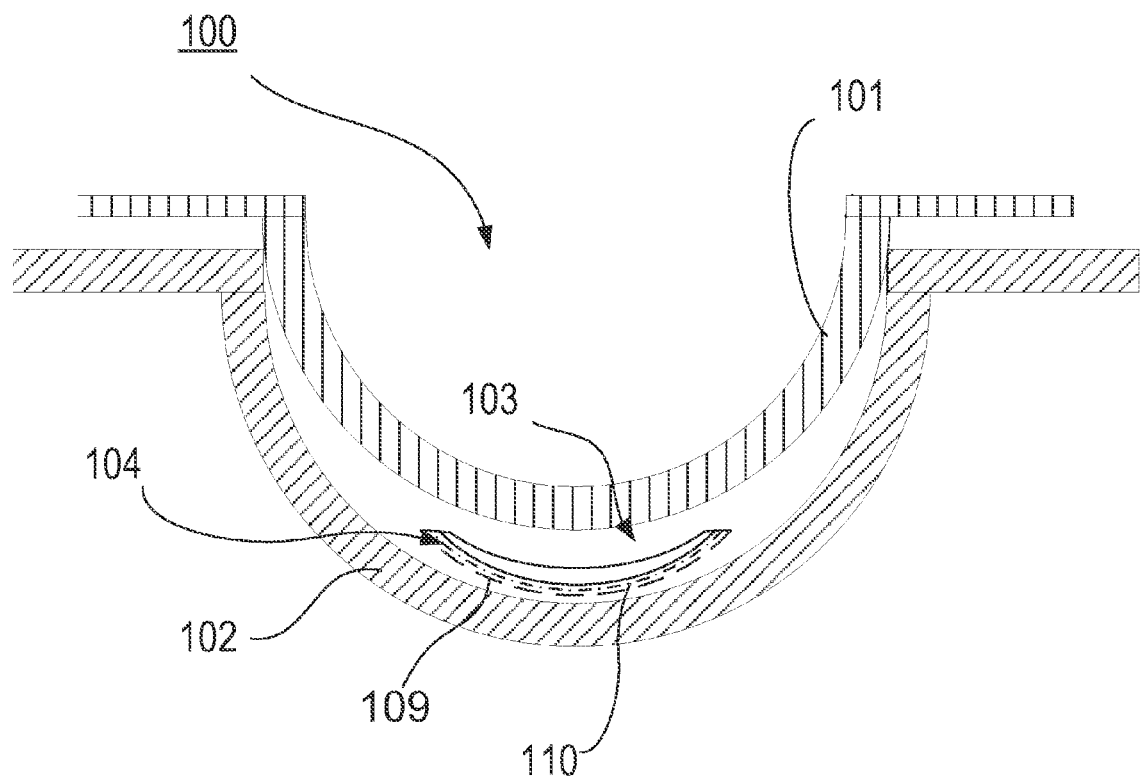
FIG. 1 illustrates exemplary mold assembly apparatus components that may be useful in implementing some embodiments of the present invention.

The present invention includes methods and apparatus for manufacturing an ophthalmic lens with a variable optic insert wherein the variable optic portion is comprised of a liquid crystal or a composite material which itself includes liquid crystal constituents. In addition, the present invention includes an ophthalmic lens with a variable optic insert comprised of liquid crystal incorporated into the ophthalmic lens.

According to the present invention, an ophthalmic lens is formed with an embedded insert and an energy source, such as an electrochemical cell or battery as the storage means for the energy. In some exemplary embodiments, the materials comprising the energy source may be encapsulated and isolated from an environment into which an ophthalmic lens is placed. In some exemplary embodiments the energy source may include an electrochemical cell chemistry which may be used in a primary or rechargeable configuration.

A wearer-controlled adjustment device may be used to vary the optic portion. The adjustment device may include, for example, an electronic device or passive device for increasing or decreasing a voltage output or engaging and disengaging the energy source. Some exemplary embodiments may also include an automated adjustment device to change the variable optic portion via an automated apparatus according to a measured parameter or a wearer input. Wearer input may include, for example, a switch controlled by wireless apparatus. Wireless may include, for example, radio frequency control, magnetic switching, patterned emanations of light, and inductance switching. In other exemplary embodiments activation may occur in response to a biological function or in response to a measurement of a sensing element within the ophthalmic lens. Other exemplary embodiments may result from the activation being triggered by a change in ambient lighting conditions as a non-limiting example.

Variation in optic power may occur when electric fields, created by the energization of electrodes, causes realignment within the liquid crystal layer thereby shifting the molecules from the resting orientation to an energized orientation. In other alternative exemplary embodiments, different effects caused by the alteration of liquid crystal layers by energization of electrodes may be exploited, for example, changing of the light polarization state, particularly, polarization rotation.

In some exemplary embodiments with liquid crystal layers, there may be elements in the non-optical zone portion of the ophthalmic lens that may be energized, whereas other exemplary embodiments may not require energization. In the exemplary embodiments without energization, the liquid crystal may be passively variable based on some exterior factor, for example, ambient temperature, or ambient light.

A liquid crystal lens may provide an electrically variable index of refraction to polarized light incident upon its body. A combination of two lenses where the optical axis orientation is rotated in the second lens relative to the first lens allows for a lens element that may be able to vary the index of refraction to ambient non-polarized light.

By combining electrically active liquid crystal layers with electrodes, a physical entity may be derived that may be controlled by applying an electrical field across the electrodes. If there is a dielectric layer that is present on the periphery of the liquid crystal layer, then the field across the dielectric layer and the field across the liquid crystal layer may combine into the field across the electrodes. In a three-dimensional shape the nature of the combination of the fields across the layers may be estimated based on electrodynamic principals and the geometry of the dielectric layer and the liquid crystal layer. If the effective electrical thickness of the dielectric layer is made in a non-uniform manner then the effect of a field across the electrodes may be "shaped" by the effective shape of the dielectric and create dimensionally shaped changes in refractive index in the liquid crystal layers. In some exemplary embodiments, such shaping may result in lenses that have the ability to adopt variable focal characteristics.

An alternative exemplary embodiment may be derived when the physical lens elements that contain the liquid crystal layers are shaped themselves to have different focal characteristics. The electrically variable index of refraction of a liquid crystal layer may then be used to introduce changes in the focal characteristics of the lens based on the application of an electric field across the liquid crystal layer through the use of electrodes. The index of refraction of a liquid crystal layer may be referred to as an effective index of refraction, and it may be possible to consider each treatment relating to an index of refraction as equivalently referring to an effective index of refraction. The effective index of refraction may come, for example, from the superposition of multiple regions with different indices of refraction. In some exemplary embodiments, the effective aspect may be an average of the various regional contributions, while in other exemplary embodiments the effective aspect may be a superposition of the regional or molecular effects upon incident light. The shape that the front containment surface makes with the liquid crystal layer and the shape that the back containment surface makes with the liquid crystal layer may determine, to first order, the focal characteristics of the system.

In the following sections detailed descriptions of embodiments of the present invention will be given. The description of both preferred and alternative embodiments are exemplary embodiments only, and it is understood that to those skilled in the art that variations, modifications and alterations may be apparent. It is therefore to be understood that the exemplary embodiments do not limit the scope of the underlying invention.

Glossary

In this description and claims directed to the present invention, various terms may be used for which the following definitions will apply:

Alignment layer: as used herein refers to a layer adjacent to a liquid crystal layer that influences and aligns the orientation of molecules within the liquid crystal layer. The resulting alignment and orientation of the molecules may affect light that passes through the liquid crystal layer. For example, the alignment and orientation may act with refractive characteristics upon the incident light. Additionally, the effect may include alteration of the polarization of the light.

Electrical Communication: as used herein refers to being influenced by an electrical field. In the case of conductive materials, the influence may result from or in the flow of electrical current. In other materials, it may be an electrical potential field that causes an influence, for example, the tendency to orient permanent and induced molecular dipoles along field lines.

Energized: as used herein refers to the state of being able to supply electrical current to or to have electrical energy stored within.

Energized orientation: as used herein refers to the orientation of the molecules of a liquid crystal when influenced by an effect of a potential field powered by an energy source. For example, a device containing liquid crystals may have one energized orientation if the energy source operates as either on or off. In other exemplary embodiments, the energized orientation may change along a scale affected by the amount of energy applied.

Energy: as used herein refers to the capacity of a physical system to do work. Many uses within the present invention may relate to the capacity of being able to perform electrical actions in doing work.

Energy source: as used herein refers to a device capable of supplying energy or placing a biomedical device in an energized state.

Energy Harvesters: as used herein refers to a device capable of extracting energy from the environment and convert it to electrical energy.

Intraocular lens: as used herein refers to an ophthalmic lens that is embedded within the eye.

Lens-Forming Mixture or Reactive Mixture or reactive monomer mixture (RMM): as used herein refers to a monomer or prepolymer material that may be cured and crosslinked or crosslinked to form an ophthalmic lens. Various embodiments may include lens-forming mixtures with one or more additives such as UV blockers, tints, photoinitiators or catalysts, and other additives one might desire in an ophthalmic lens such as, for example, contact or intraocular lenses.

Lens-Forming Surface: as used herein refers to a surface that is used to mold a lens. In some exemplary embodiments, any such surface may have an optical quality surface finish, which indicates that it is sufficiently smooth and formed so that a lens surface fashioned by the polymerization of a lens-forming mixture in contact with the molding surface is optically acceptable. Further, in some exemplary embodiments, the lens-forming surface may have a geometry that is necessary to impart to the lens surface the desired optical characteristics, including, for example, spherical, aspherical and cylinder power, wave front aberration correction, and corneal topography correction.

Liquid Crystal: as used herein refers to a state of matter having properties between a conventional liquid and a solid crystal. A liquid crystal may not be characterized as a solid, but its molecules exhibit some degree of alignment. As used herein, a liquid crystal is not limited to a particular phase or structure, but a liquid crystal may have a specific resting orientation. The orientation and phases of a liquid crystal may be manipulated by external forces, for example, temperature, magnetism, or electricity, depending on the class of liquid crystal.

Lithium Ion Cell: as used herein refers to an electrochemical cell where Lithium ions move through the cell to generate electrical energy. This electrochemical cell, typically called a battery, may be reenergized or recharged in its typical forms.

Media insert or insert: as used herein refers to a formable or rigid substrate capable of supporting an energy source within an ophthalmic lens. In some exemplary embodiments, the media insert also includes one or more variable optic portions.

Mold: as used herein refers to a rigid or semi-rigid object that may be used to form lenses from uncured formulations. Some preferred molds include two mold parts forming a front curve mold part and a back curve mold part.

Ophthalmic Lens or Lens: as used herein refers to any ophthalmic device that resides in or on the eye. These devices may provide optical correction or modification, or may be cosmetic. For example, the term "lens" may refer to a contact lens, intraocular lens, overlay lens, ocular insert, optical insert, or other similar device through which vision is corrected or modified, or through which eye physiology is cosmetically enhanced (e.g. iris color) without impeding vision. In some exemplary embodiments, the preferred lenses of the invention are soft contact lenses which are made from silicone elastomers or hydrogels, which include, for example, silicone hydrogels and fluorohydrogels.

Optical zone: as used herein refers to an area of an ophthalmic lens through which a wearer of the ophthalmic lens sees.

Power: as used herein refers to work done or energy transferred per unit of time.

Rechargeable or Reenergizable: as used herein refers to a capability of being restored to a state with higher capacity to do work. Many uses within the present invention may relate to the capability of being restored with the ability to flow electrical current at a certain rate for certain, reestablished time period.

Reenergize or Recharge: as used herein refers to the restoration of an energy source to a state with higher capacity to do work. Many uses within the present invention may relate to restoring a device to the capability to flow electrical current at a certain rate for a certain, reestablished time period.

Released from a mold: as used herein refers to a lens that is either completely separated from the mold, or is only loosely attached so that it may be removed with mild agitation or pushed off with a swab.

Resting orientation: as used herein refers to the orientation of the molecules of a liquid crystal device in its resting, non-energized state.

Variable optic: as used herein refers to the capacity to change an optical quality, for example, the optical power of a lens or the polarizing angle.

Ophthalmic Lenses

Referring to FIG. 1, an apparatus 100 to form ophthalmic devices comprising sealed and encapsulated inserts is depicted. The apparatus includes an exemplary front curve mold 102 and a matching back curve mold 101. A variable optic insert 104 and a body 103 of the ophthalmic device may be located inside the front curve mold 102 and the back curve mold 101. In some exemplary embodiments, the material of the body 103 may be a hydrogel material, and the variable optic insert 104 may be surrounded on all surfaces by this material.

The variable optic insert 104 may comprise multiple liquid crystal layers 109 and 110. Other exemplary embodiments may include a single liquid crystal layer, some of which are discussed in later sections. The use of the apparatus 100 may create a novel ophthalmic device comprised of a combination of components with numerous sealed regions.

In some exemplary embodiments, a lens with a variable optic insert 104 may include a rigid center soft skirt design wherein a central rigid optical element including the liquid crystal layers 109 and 110 is in direct contact with the atmosphere and the corneal surface on respective anterior and posterior surfaces. The soft skirt of lens material (typically a hydrogel material) is attached to a periphery of the rigid optical element, and the rigid optical element may also add energy and functionality to the resulting ophthalmic lens.

Figure 2A:
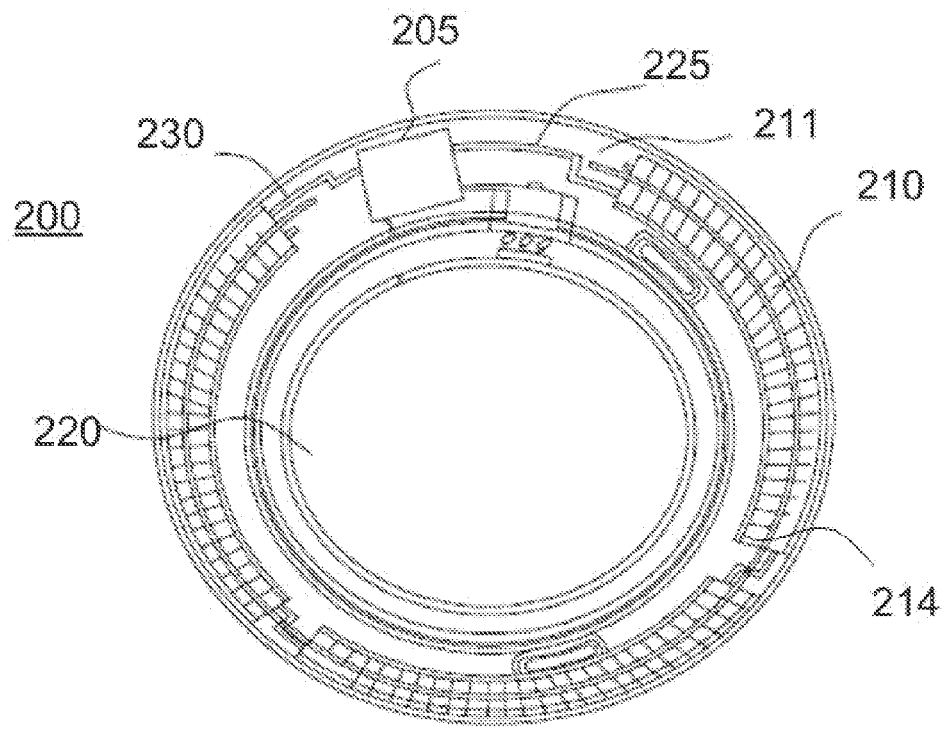
FIGS. 2A and 2B illustrate an exemplary embodiment of an energized ophthalmic lens with a variable optic insert.
Figure 2B:
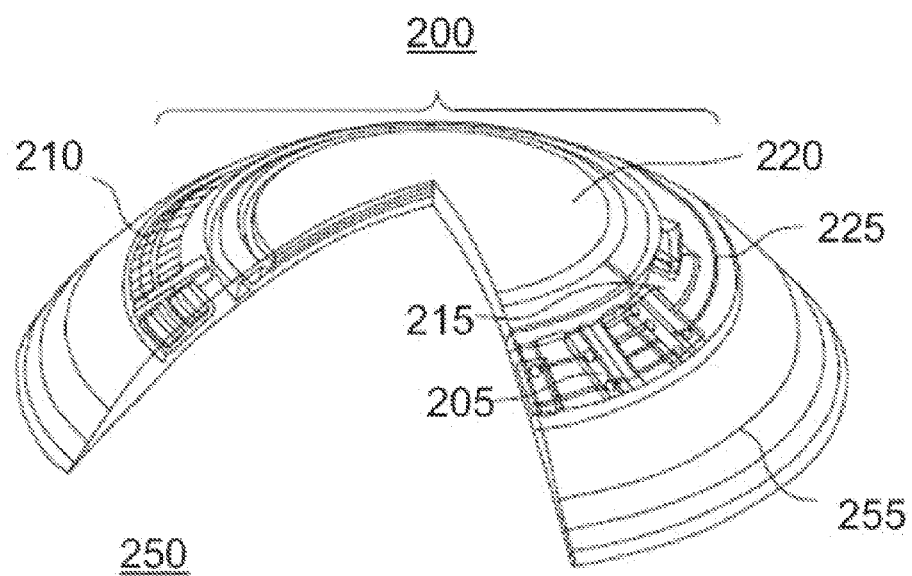

Referring to FIG. 2A, at 200 a top down and FIG. 2B at 250 a cross sectional depiction of an exemplary embodiment of a variable optic insert is shown. In this depiction, an energy source 210 is shown in a periphery portion 211 of the variable optic insert 200. The energy source 210 may include, for example, a thin film, rechargeable lithium ion battery or an alkaline cell based battery. The energy source 210 may be connected to interconnect features 214 to allow for interconnection. Additional interconnects at 225 and 230 for example may connect the energy source 210 to a circuit such as item 205. In other exemplary embodiments, an insert may have interconnect features deposited on its surface.

In some exemplary embodiments, the variable optic insert 200 may include a flexible substrate. This flexible substrate may be formed into a shape approximating a typical lens form in a similar manner previously discussed or by other means. However to add additional flexibility, the variable optic insert 200 may include additional shape features such as radial cuts along its length. There may be multiple electronic components such as that indicated by 205 such as integrated circuits, discrete components, passive components and such devices that may also be included.

A variable optic portion 220 is also illustrated. The variable optic portion 220 may be varied on command through the application of a current through the variable optic insert which in turn may typically vary an electric field established across a liquid crystal layer. In some exemplary embodiments, the variable optic portion 220 comprises a thin layer comprising liquid crystal between two layers of transparent substrate. There may be numerous manners of electrically activating and controlling the variable optic component, typically through action of the electronic circuit 205. The electronic circuit, 205 may receive signals in various manners and may also connect to sensing elements which may also be in the insert such as item 215. In some exemplary embodiments, the variable optic insert may be encapsulated into a lens skirt 255, which may be comprised of hydrogel material or other suitable material to form an ophthalmic lens. In these exemplary embodiments the ophthalmic lens may be comprised of the ophthalmic skirt 255 and an encapsulated ophthalmic lens insert 200 which may itself comprise layers or regions of liquid crystal material or comprising liquid crystal material and in some embodiments the layers may comprise polymer networked regions of interstitially located liquid crystal material.

A Variable Optic Insert Including Liquid Crystal Elements

Figure 3:
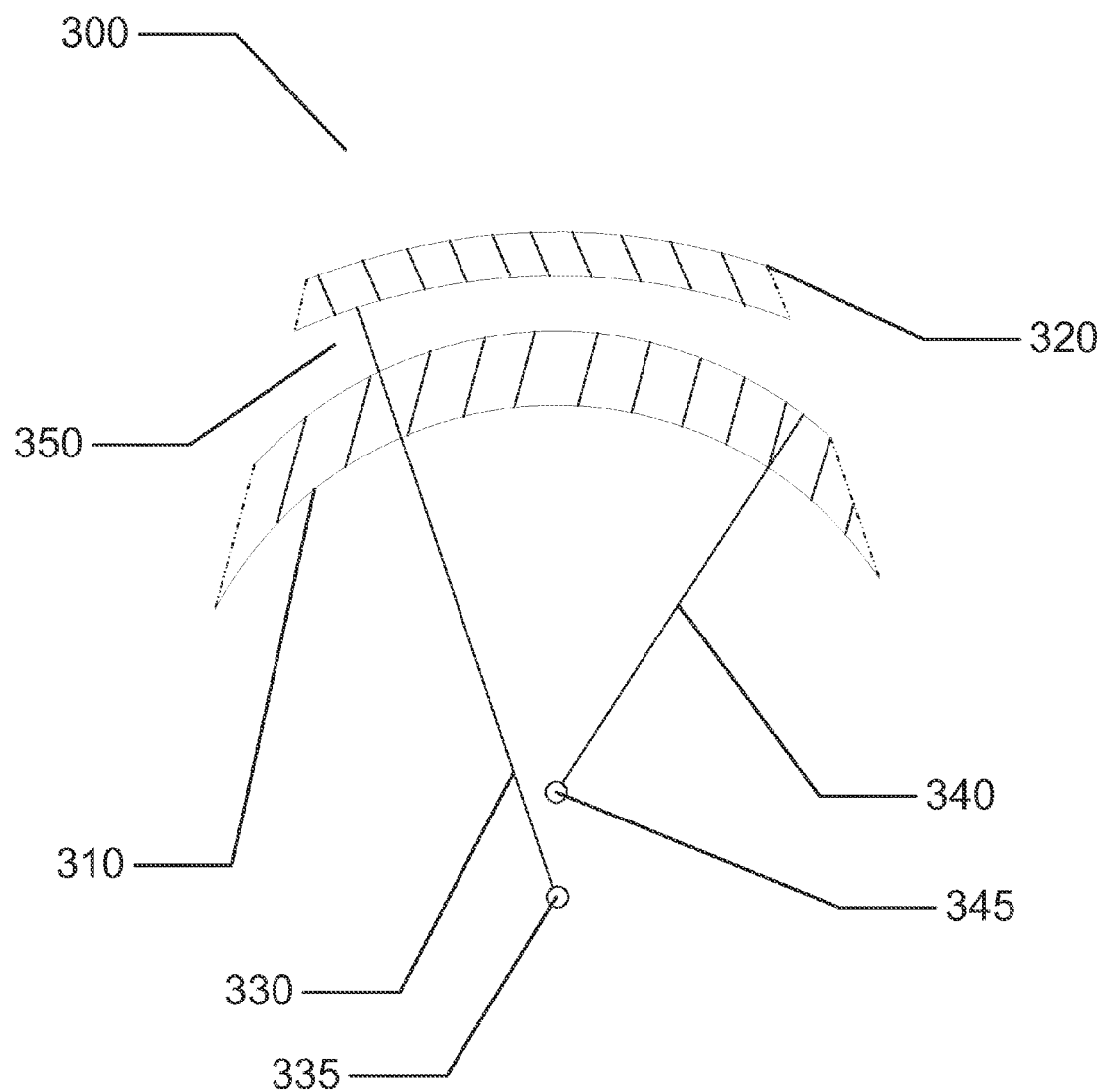
FIG. 3 illustrates a cross sectional view of a variable optic insert where the front and back curve pieces of the variable optic insert may have different curvature and wherein the variable optic portion may be comprised of liquid crystal.

Referring to FIG. 3, item 300, an illustration of the lens effect of two differently shaped lens pieces may be found. As mentioned previously, a variable optic insert of the inventive art herein may be formed by enclosing an electrode and liquid crystal layer system within two differently shaped lens pieces. The electrode and liquid crystal layer system may occupy a space between the lens pieces as illustrated at 350. At 320 a front curve piece may be found and at 310, a rear curve piece may be found.

In a non-limiting example, the front curve piece 320 may have a concave shaped surface that interacts with the space 350. The shape may be further characterized as having a radius of curvature depicted as 330 and a focal point 335 in some exemplary embodiments. Other more complicated shapes with various parametric characteristics may be formed within the scope of the inventive art; however, for illustration a simple spherical shape may be depicted.

In a similar and also non-limiting fashion, the back curve piece 310 may have a convex shaped surface that interacts with the space 350. The shape may be further characterized as having a radius of curvature depicted as 340 and a focal point 345 in some exemplary embodiments. Other more complicated shapes with various parametric characteristics may be formed within the scope of the inventive art; however, for illustration a simple spherical shape may be depicted.

To illustrate how the lens of the type as 300 may operate, the material that comprises items 310 and 320 may have a natural index of refraction of a value. Within the space 350 the liquid crystal layer may be chosen in a non-limiting example to match that value for the index of refraction. Thus when light rays traverse the lens pieces 310 and 320 and the space 350, they will not react to the various interfaces in a manner that would adjust the focal characteristics. In its function, portions of the lens not shown may activate an energization of various components that may result in the liquid crystal layer in space 350 assuming a different index of refraction to the incident light ray. In a non-limiting example, the resulting index of refraction may be lowered. Now, at each material interface the path of the light may be modeled to be altered based on the focal characteristics of the surface and the change of the index of refraction.

The model may be based on Snell's law: $\sin(\theta_1')/\sin(\theta_2) = n_2/n_1$. For example, the interface may be formed by piece 320 and space 350; $\theta_1$ may be the angle that the incident ray makes with a surface normal at the interface. $\theta_2$ may be the modeled angle that the ray makes with a surface normal as it leaves the interface. $n_2$ may represent the index of refraction of the space 350 and $n_1$ may represent the index of refraction of the piece 320. When $n_1$ is not equal to $n_2$ then the angles $\theta_1$ and $\theta_2$ will be different as well. Thus, when the electrically variable index of refraction of the liquid crystal layer in space 350 is changed, the path that a light ray would take at the interface will change as well.

Figure 4:
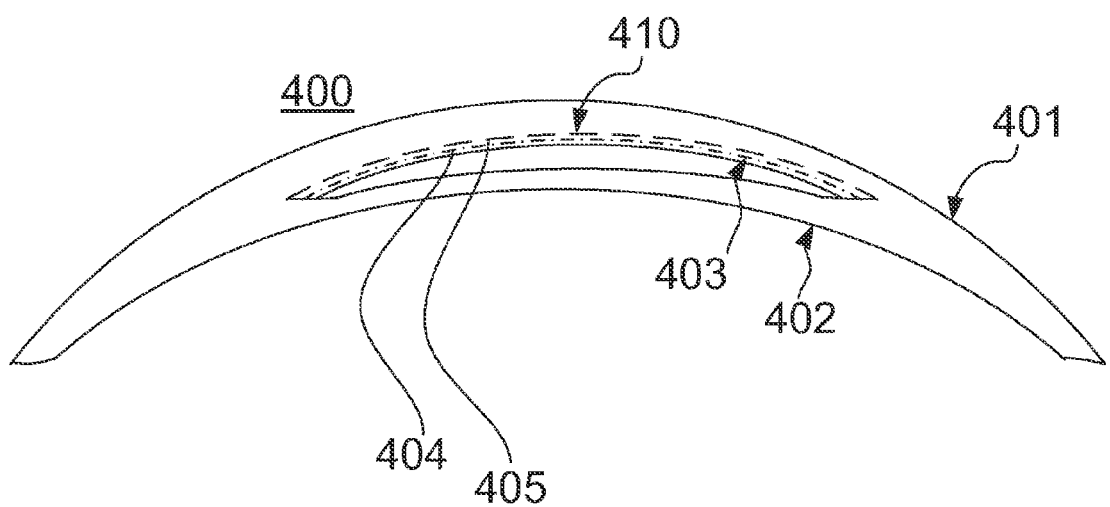
FIG. 4 illustrates a cross sectional view of an ophthalmic lens device embodiment with a variable optic insert wherein the variable optic portion may be comprised of polymer networked regions of interstitially located liquid crystal.

Referring to FIG. 4, an ophthalmic lens 400 is shown with an embedded variable optic insert 410. The ophthalmic lens 400 may have a front curve surface 401 and a back curve surface 402. The insert 410 may have a variable optic portion 403 with a liquid crystal layer 404. In some exemplary embodiments, the insert 410 may have multiple liquid crystal layers 404 and 405. Portions of the insert 410 may overlap with the optical zone of the ophthalmic lens 400.

Figure 5:
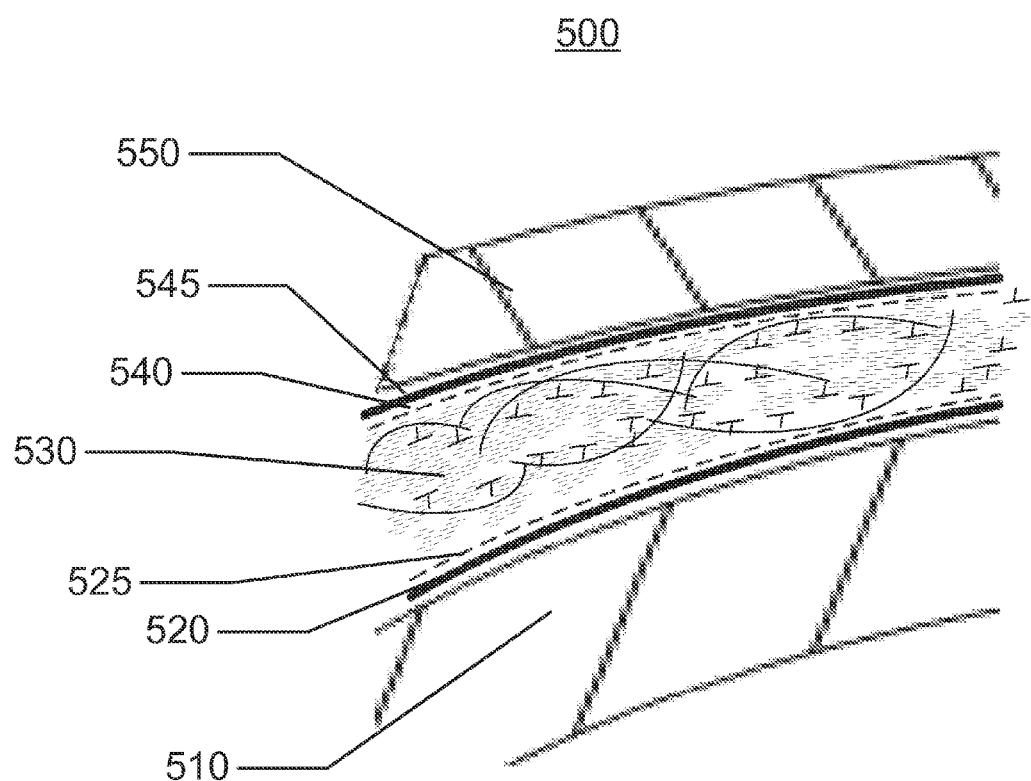
FIG. 5 illustrates an exemplary embodiment of a variable optic insert wherein the variable optic portion may be comprised of polymer networked regions of interstitially located liquid crystal.

Referring to FIG. 5, a variable optic portion 500 that may be inserted into an ophthalmic lens is illustrated with a liquid crystal layer 530. The variable optic portion 500 may have a similar diversity of materials and structural relevance as has been discussed in other sections of this specification. In some exemplary embodiments, a transparent electrode 545 may be placed on a first transparent substrate 550. The first lens surface 540 may be comprised of a dielectric film, and in some exemplary embodiments, alignment layers which may be placed upon the first transparent electrode 545. In such embodiments, the shape of the dielectric layer of the first lens surface may form a regionally varied shape in the dielectric thickness as depicted. Such a regionally varied shape may introduce additional focusing power of the lens element above the geometric effects discussed in reference to FIG. 3. In some exemplary embodiments, the shaped dielectric layer may be formed by injection molding upon the first transparent electrode 545 transparent substrate 550 combination.

In some exemplary embodiments the first transparent electrode 545 and a second transparent electrode 520 may be shaped in various manners. In some examples, the shaping may result in separate and distinct regions being formed that may have energization applied separately. In other examples, the electrodes may be formed into patterns such as a helix from the center of the lens to the periphery which may apply a variable electric field across the liquid crystal layer. The shaping of electrodes in these manners may also introduce additional focusing power of the lens element under operation.

This effect may result in larger electric fields being used to align the liquid crystal molecules into an energized state. As well, the engineering of the chemical structures of the liquid crystal molecules may also help to define conditions that allow for lower electrical fields being required for establishing aligned states.

In a first example, a mixture of a monomer and a liquid crystal molecule may be formed with the combination being heated to form an homogenous mixture. Next, the mixture may be applied to a front curve insert piece and then encapsulated in the lens insert by the addition of a back curve or intermediate insert piece. The insert containing the liquid crystal mixture may then be caused to polymerize under predetermined conditions forming cross linked networked regions of polymerized material as well as intercalated regions of liquid within the interstices of the polymer network. In some examples, actinic radiation may be shone on the mixture to initiate polymerization.

In another example, a mixture of liquid crystal and liquid crystal monomer may also be performed. In this example, the mixture may be applied to a front curve piece or a rear or intermediate curve piece and then the additional piece may be applied. The applied mixture may already contain components to trigger the polymerization reactions. Or, actinic radiation may be shone upon the mixture to initiate polymerization. With certain material choices for the monomer and initiating agents, the polymerization reaction may proceed at a rate and in such a manner that high concentration regions of liquid crystal monomer that are similar to droplets or droplets within the polymerized network of material may be formed. These liquid crystal molecules may be free to move within the polymer matrix before it is fully polymerized and may also be able to feel orienting effects in their neighboring regions which may be other liquid crystal molecules or alignment features on the surfaces of the insert pieces that the liquid crystal mixture was applied to. The alignment regions, if there are any, may determine a resting state for the liquid crystal molecules within the polymer matrix and may determine a fixed orientation of the liquid crystal molecules in the polymerized regions after significant polymerization has occurred. As well, the aligned liquid crystal molecules in the polymer may also exert an orienting effect on the liquid crystal molecules within the interstitial regions. Thus, the layer of combined polymerized regions and included interstitial regions may exist in a natural alignment state predetermined by the inclusion of alignment features upon the insert pieces before the insert is formed with the liquid crystal intermediate layer.

There may be numerous manners to incorporate liquid crystal molecules into the polymerized or gelled regions. In the previous descriptions some manners have been described. Nevertheless, any method of creating polymer networked liquid crystal layers may comprise art within the scope of the present invention and may be used to create an ophthalmic device. The previous examples mentioned the use of monomers with attached liquid crystal portions to create networked layers that create interstitial locations for unbound liquid crystal molecules. The state of the polymer may be a crystalline form, a semicrystalline form or an amorphous form of polymerized material or in other embodiments may also exist as a gelled or semi-gelled form of polymer.

The variable optic portion 500 in FIG. 5 may have other aspects that may be defined by a similar diversity of materials and structural relevance as has been discussed in other sections of this specification. In some exemplary embodiments, a transparent electrode 520 may be placed on the second transparent substrate 510. The second lens surface may be comprised of a dielectric film, and in some embodiments, alignment layers which may be placed upon the second transparent electrode 520. In such embodiments, the shape of the dielectric layer of the second lens surface 525 may form a regionally varied shape in the dielectric thickness. A dielectric layer on the first lens surface at 540 may also be formed to comprise a varied shape in dielectric thickness. Such regionally varied shape may introduce additional focusing power of the lens element. In some exemplary embodiments, for example, the shaped layer may be formed by injection molding upon the second transparent electrode 520 substrate 510 combination.

In some exemplary embodiments the second transparent electrode 520 and the first transparent electrode 545 may be shaped in various manners. In some examples, the shaping may result in separate distinct regions being formed that may have energization applied separately. In other examples, the electrodes may be formed into patterns such as a helix from the center of the lens to the periphery which may apply a variable electric field across the liquid crystal layer 530. In either case, such electrode shaping may be performed in addition to the shaping of dielectric layers upon the electrode or instead of such shaping. The shaping of electrodes in these manners may also introduce additional focusing power of the lens element under operation.

A liquid crystal layer 530 may be located between the first transparent electrode 545 and a second transparent electrode 520. The second transparent electrode 520 may be attached to the bottom substrate layer 510, wherein the device formed from bottom substrate layer 510 to the top substrate layer 550 may contain the variable optic portion 500 of the ophthalmic lens. Two alignment layers may also be located at 540 and 525 upon the dielectric layer and may surround the liquid crystal layer 530. The alignment layers at 540 and 525 may function to define a resting orientation of the ophthalmic lens. In some exemplary embodiments, the electrode layers 520 and 545 may be in electrical communication with liquid crystal layer 530 and cause a shift in orientation from the resting orientation to at least one energized orientation.

Figure 6:
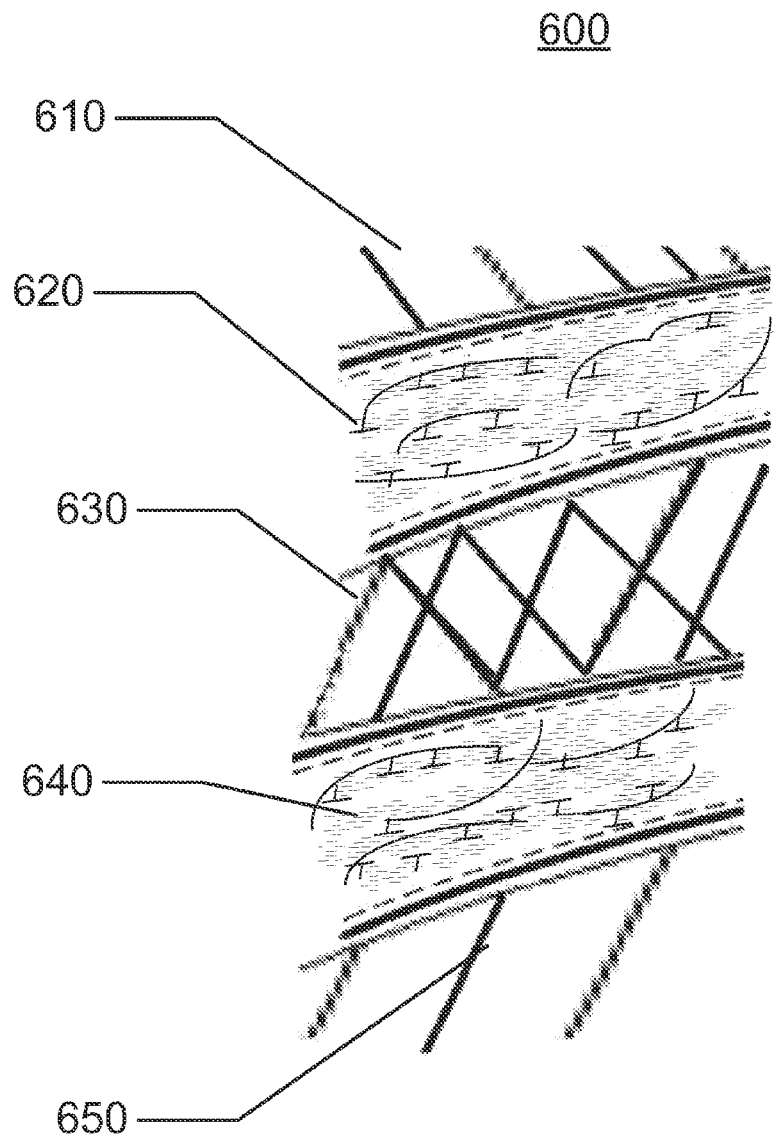
FIG. 6 illustrates an alternative embodiment of a variable optic lens comprising an insert wherein the variable optic portions may be comprised of polymer networked regions of interstitially located liquid crystal.

Referring to FIG. 6, an alternative of a variable optic insert 600 that may be inserted into an ophthalmic lens is illustrated with two liquid crystal layers 620 and 640. Each of the aspects of the various layers around the liquid crystal region may have similar diversity as described in relation to the variable optic insert 500 in FIG. 5. In some exemplary embodiments, the alignment layers may introduce polarization sensitivity into the function of a single liquid crystal element. By combining a first liquid crystal based element formed by a first substrate 610, whose intervening layers in the space around 620 and a second substrate 630 may have a first polarization preference, with a second liquid crystal based element formed by a second surface on the second substrate 630, the intervening layers in the space around 640 and a third substrate 650 with a second polarization preference, a combination may be formed which may allow for an electrically variable focal characteristic of a lens that is not sensitive to the polarization aspects of incident light upon it.

At the exemplary element 600, a combination of two electrically active liquid crystal layers of the various types and diversity associated with the example at 500 may be formed utilizing three substrate layers. In other examples, the device may be formed by the combination of four different substrates. In such examples, the intermediate substrate 630 may be split into two layers. If the substrates are combined at a later time, a device that functions similarly to item 600 may result. The combination of four layers may present an example for the manufacturing of the element where similar devices may be constructed around both 620 and 640 liquid crystal layers where the processing difference may relate to the portion of steps that define alignment features for the liquid crystal element. In still further examples, if the lens element around a single liquid crystal layer such as that depicted at 500 is spherically symmetric or symmetric upon a rotation of ninety degrees, then two pieces may be assembled into a structure of the type depicted at 600 by rotating the two pieces ninety degrees relative to each other before assembling.

In generalizing the exemplary embodiments discussed around FIG. 6, there may be multiple intermediate pieces that are included in forming an ophthalmic lens. Each of these pieces may define regions between the pieces where various layers may be formed, such as in a non-limiting sense liquid crystal layers, alignment layers and electrodes. It may be clear to those skilled in the art that an ophthalmic device with an insert formed of numerous insert pieces may have electrodes applied to some or all of the insert surfaces that are present in the device. The application of electrical potential may therefore be applied across a number of potential combinations of insert surfaces that have an electrode applied thereon.

Materials

Microinjection molding embodiments may include, for example, a poly(4-methylpent-1-ene) copolymer resin are used to form lenses with a diameter of between about 6 mm to 10 mm and a front surface radius of between about 6 mm and 10 mm and a rear surface radius of between about 6 mm and 10 mm and a center thickness of between about 0.050 mm and 1.0 mm. Some exemplary embodiments include an insert with diameter of about 8.9 mm and a front surface radius of about 7.9 mm and a rear surface radius of about 7.8 mm and a center thickness of about 0.200 mm and an edge thickness of about 0.050 mm.

The variable optic insert 104 illustrated in FIG. 1 may be placed in a mold part 101 and 102 utilized to form an ophthalmic lens. Mold part 101 and 102 material may include, for example, a polyolefin of one or more of: polypropylene, polystyrene, polyethylene, polymethyl methacrylate, and modified polyolefins. Other molds may include a ceramic or metallic material.

A preferred alicyclic co-polymer contains two different alicyclic polymers. Various grades of alicyclic co-polymers may have glass transition temperatures ranging from 105° C. to 160° C.

In some exemplary embodiments, the molds of the present invention may contain polymers such as polypropylene, polyethylene, polystyrene, polymethyl methacrylate, modified polyolefins containing an alicyclic moiety in the main chain and cyclic polyolefins. This blend may be used on either or both mold halves, where it is preferred that this blend is used on the back curve and the front curve consists of the alicyclic co-polymers.

In some preferred methods of making molds 100 according to the present invention, injection molding is utilized according to known techniques, however, exemplary embodiments may also include molds fashioned by other techniques including, for example: lathing, diamond turning, or laser cutting.

Typically, lenses are formed on at least one surface of both mold parts 101 and 102. However, in some exemplary embodiments, one surface of a lens may be formed from a mold part 101 or 102 and another surface of a lens may be formed using a lathing method, or other methods.

In some exemplary embodiments, a preferred lens material includes a silicone containing component. A "silicone-containing component" is one that contains at least one [—Si—O—] unit in a monomer, macromer or prepolymer. Preferably, the total Si and attached O are present in the silicone-containing component in an amount greater than about 20 weight percent, and more preferably greater than 30 weight percent of the total molecular weight of the silicone-containing component. Useful silicone-containing components preferably comprise polymerizable functional groups such as acrylate, methacrylate, acrylamide, methacrylamide, vinyl, N-vinyl lactam, N-vinylamide, and styryl functional groups.

In some exemplary embodiments, the ophthalmic lens skirt, also called an insert-encapsulating layer, that surrounds the insert may be comprised of standard hydrogel ophthalmic lens formulations. Exemplary materials with characteristics that may provide an acceptable match to numerous insert materials may include, the Narafilcon family (including Narafilcon A and Narafilcon B), and the Etafilcon family (including Etafilcon A). A more technically inclusive discussion follows on the nature of materials consistent with the art herein. One ordinarily skilled in the art may recognize that other material other than those discussed may also form an acceptable enclosure or partial enclosure of the sealed and encapsulated inserts and should be considered consistent and included within the scope of the claims.

Suitable silicone containing components include compounds of Formula I

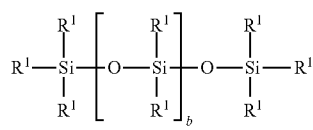

where $R^1$ is independently selected from monovalent reactive groups, monovalent alkyl groups, or monovalent aryl groups, any of the foregoing which may further comprise functionality selected from hydroxy, amino, oxa, carboxy, alkyl carboxy, alkoxy, amido, carbamate, carbonate, halogen or combinations thereof; and monovalent siloxane chains comprising 1-100 Si—O repeat units which may further comprise functionality selected from alkyl, hydroxy, amino, oxa, carboxy, alkyl carboxy, alkoxy, amido, carbamate, halogen or combinations thereof;

where b=0 to 500, where it is understood that when b is other than 0, b is a distribution having a mode equal to a stated value;

wherein at least one $R^1$ comprises a monovalent reactive group, and in some exemplary embodiments between one and 3 $R^1$ comprise monovalent reactive groups.

As used herein "monovalent reactive groups" are groups that may undergo free radical and/or cationic polymerization. Non-limiting examples of free radical reactive groups include (meth)acrylates, styryls, vinyls, vinyl ethers, $C_{1-6}$alkyl(meth)acrylates, (meth)acrylamides, $C_{1-6}$alkyl(meth)acrylamides, N-vinyllactams, N-vinylamides, $C_{2-12}$alkenyls, $C_{2-12}$alkenylphenyls, $C_{2-12}$alkenylnaphthyls, $C_{2-6}$alkenylphenyl$C_{1-6}$alkyls, O-vinylcarbamates and O-vinylcarbonates. Non-limiting examples of cationic reactive groups include vinyl ethers or epoxide groups and mixtures thereof. In one embodiment the free radical reactive groups comprises (meth)acrylate, acryloxy, (meth)acrylamide, and mixtures thereof.

Suitable monovalent alkyl and aryl groups include unsubstituted monovalent $C_1$ to $C_{16}$alkyl groups, $C_6$-$C_{14}$ aryl groups, such as substituted and unsubstituted methyl, ethyl, propyl, butyl, 2-hydroxypropyl, propoxypropyl, polyethyleneoxypropyl, combinations thereof and the like.

In one exemplary embodiment, b is zero, one $R^1$ is a monovalent reactive group, and at least 3 $R^1$ are selected from monovalent alkyl groups having one to 16 carbon atoms, and in another exemplary embodiment from monovalent alkyl groups having one to 6 carbon atoms. Non-limiting examples of silicone components of this embodiment include 2-methyl-,2-hydroxy-3-[3-[1,3,3,3-tetramethyl-1-[(trimethylsilyl)oxy]disiloxanyl]propoxy]propyl ester ("SiGMA"), 2-hydroxy-3-methacryloxypropyloxypropyl-tris(trimethylsiloxy)silane, 3-methacryloxypropyltris(trimethylsiloxy)silane ("TRIS"), 3-methacryloxypropylbis(trimethylsiloxy)methylsilane and 3-methacryloxypropylpentamethyl disiloxane.

In another exemplary embodiment, b is 2 to 20, 3 to 15 or in some exemplary embodiments 3 to 10; at least one terminal $R^1$ comprises a monovalent reactive group and the remaining $R^1$ are selected from monovalent alkyl groups having 1 to 16 carbon atoms, and in another embodiment from monovalent alkyl groups having 1 to 6 carbon atoms. In yet another embodiment, b is 3 to 15, one terminal $R^1$ comprises a monovalent reactive group, the other terminal $R^1$ comprises a monovalent alkyl group having 1 to 6 carbon atoms and the remaining $R^1$ comprise monovalent alkyl group having 1 to 3 carbon atoms. Non-limiting examples of silicone components of this embodiment include (mono-(2-hydroxy-3-methacryloxypropyl)-propyl ether terminated polydimethylsiloxane (400-1000 MW)) ("OH-mPDMS"), monomethacryloxypropyl terminated mono-n-butyl terminated polydimethylsiloxanes (800-1000 MW), ("mPDMS").

In another exemplary embodiment, b is 5 to 400 or from 10 to 300, both terminal $R^1$ comprise monovalent reactive groups and the remaining $R^1$ are independently selected from monovalent alkyl groups having 1 to 18 carbon atoms, which may have ether linkages between carbon atoms and may further comprise halogen.

In one exemplary embodiment, where a silicone hydrogel lens is desired, the lens of the present invention will be made from a reactive mixture comprising at least about 20 and preferably between about 20 and 70% wt silicone containing components based on total weight of reactive monomer components from which the polymer is made.

In another embodiment, one to four $R^1$ comprises a vinyl carbonate or carbamate of the formula:

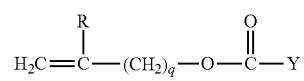

Formula II wherein: Y denotes O—, S— or NH—;
R denotes, hydrogen or methyl; d is 1, 2, 3 or 4; and q is 0 or 1.

The silicone-containing vinyl carbonate or vinyl carbamate monomers specifically include: 1,3-bis[4-(vinyloxycarbonyloxy)but-1-yl]tetramethyl-disiloxane; 3-(vinyloxycarbonylthio) propyl-[tris(trimethylsiloxy)silane]; 3-[tris(trimethylsiloxy)silyl]propyl allyl carbamate; 3-[tris(trimethylsiloxy)silyl]propyl vinyl carbamate; trimethylsilylethyl vinyl carbonate; trimethylsilylmethyl vinyl carbonate, and

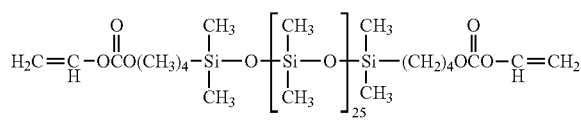

Where biomedical devices with modulus below about 200 are desired, only one $R^1$ shall comprise a monovalent reactive group and no more than two of the remaining $R^1$ groups will comprise monovalent siloxane groups.

Another class of silicone-containing components includes polyurethane macromers of the following formulae:

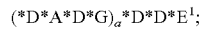

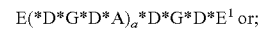

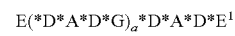  Formulae IV-VI wherein:
D denotes an alkyl diradical, an alkyl cycloalkyl diradical, a cycloalkyl diradical, an aryl diradical or an alkylaryl diradical having 6 to 30 carbon atoms, G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;
* denotes a urethane or ureido linkage;
$a$ is at least 1;
A denotes a divalent polymeric radical of formula:

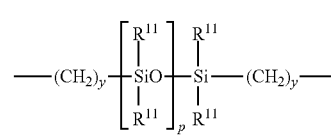

Formula VII $R^{11}$ independently denotes an alkyl or fluoro-substituted alkyl group having 1 to 10 carbon atoms, which may contain ether linkages between carbon atoms; y is at least 1; and p provides a moiety weight of 400 to 10,000; each of E and $E^1$ independently denotes a polymerizable unsaturated organic radical represented by formula:

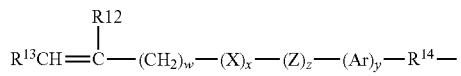

Formula VIII wherein: $R^{12}$ is hydrogen or methyl; $R^{13}$ is hydrogen, an alkyl radical having 1 to 6 carbon atoms, or a —CO—Y—$R^{15}$ radical wherein Y is —O—, Y—S— or —NH—; $R^{14}$ is a divalent radical having 1 to 12 carbon atoms; X denotes —CO— or —OCO—; Z denotes —O— or —NH—; Ar denotes an aromatic radical having 6 to 30 carbon atoms; w is 0 to 6; x is 0 or 1; y is 0 or 1; and z is 0 or 1.

A preferred silicone-containing component is a polyurethane macromer represented by the following formula:

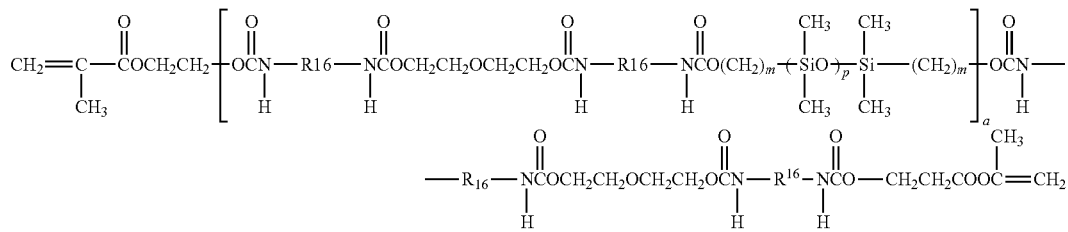

Formula IX wherein $R^{16}$ is a diradical of a diisocyanate after removal of the isocyanate group, such as the diradical of isophorone diisocyanate. Another suitable silicone containing macromer is compound of formula X (in which x+y is a number in the range of 10 to 30) formed by the reaction of fluoroether, hydroxy-terminated polydimethylsiloxane, isophorone diisocyanate and isocyanatoethylmethacrylate.

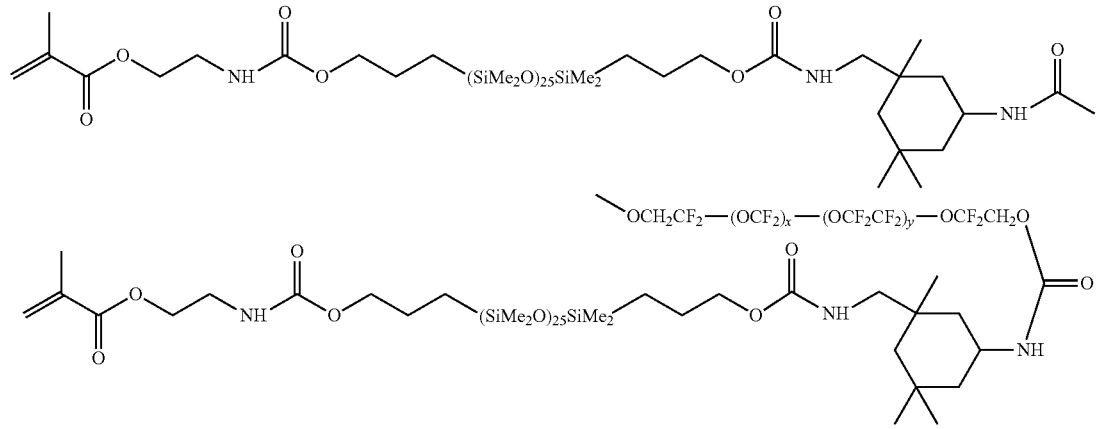

Formula X

Other silicone containing components suitable for use in the present invention include macromers containing polysiloxane, polyalkylene ether, diisocyanate, polyfluorinated hydrocarbon, polyfluorinated ether and polysaccharide groups; polysiloxanes with a polar fluorinated graft or side group having a hydrogen atom attached to a terminal difluoro-substituted carbon atom; hydrophilic siloxanyl methacrylates containing ether and siloxanyl linkanges and crosslinkable monomers containing polyether and polysiloxanyl groups. Any of the foregoing polysiloxanes may also be used as the silicone containing component in the present invention.

Liquid Crystal Materials

There may be numerous materials that may have characteristics consistent with the liquid crystal layer types that have been discussed herein. It may be expected that liquid crystal materials with favorable toxicity may be preferred and naturally derived cholesteryl based liquid crystal materials may be useful. In other examples, the encapsulation technology and materials of ophthalmic inserts may allow a broad choice of materials that may include the LCD display related materials which may typically be of the broad categories related to nematic or cholesteric N or smectic liquid crystals or liquid crystal mixtures. Commercially available mixtures such as Merck Specialty chemicals Licristal mixtures for TN, VA, PSVA, IPS and FFS applications and other commercially available mixtures may form a material choice to form a liquid crystal layer.

In a non-limiting sense, mixtures or formulations may comprise the following liquid crystal materials: 1-(trans-4-Hexylcyclohexyl)-4-isothiocyanatobenzene liquid crystal, benzoic acid compounds including (4-Octylbenzoic acid and 4-Hexylbenzoic acid), carbonitrile compounds including (4'-Pentyl-4-biphenylcarbonitrile, 4'-Octyl-4-biphenylcarbonitrile, 4'-(Octyloxy)-4-biphenylcarbonitrile, 4'-(Hexyloxy)-4-biphenylcarbonitrile, 4-(trans-4-Pentylcyclohexyl)benzonitrile, 4'-(Pentyloxy)-4-biphenylcarbonitrile, 4'-Hexyl-4-biphenylcarbonitrile), and 4,4'-Azoxyanisole.

In a non-limiting sense, formulations showing particularly high birefringence of $n_{par}-n_{perp}>0.3$ at room temperature may be used as a liquid crystal layer forming material. For example, such formulation referred to as W1825 may be as available from AWAT and BEAM Engineering for Advanced Measurements Co. (BEAMCO).

There may be other classes of liquid crystal materials that may be useful for the inventive concepts here. For example, ferroelectric liquid crystals may provide function for electric field oriented liquid crystal embodiments, but may also introduce other effects such as magnetic field interactions. Interactions of electromagnetic radiation with the materials may also differ.

Alignment Layer Materials:

In many of the exemplary embodiments that have been described herein, the liquid crystal layers within ophthalmic lenses may need to be aligned in various manners at insert boundaries. The alignment, for example, may be parallel or perpendicular to the boundaries of the inserts, and this alignment may be obtained by proper processing of the various surfaces. The processing may involve coating the substrates of the inserts that contain the liquid crystal (LC) by alignment layers. Those alignment layers are described herein.

A technique commonly practiced in liquid crystal based devices of various types may be the rubbing technique. This technique may be adapted to account for the curved surfaces such as the ones of the insert pieces used for enclosing the liquid crystal. In an example, the surfaces may be coated by a Polyvinyl Alcohol (PVA) layer. For example, a PVA layer may be spin coated using a 1 wt. % aqueous solution. The solution may be applied with spin coating at 1000 rpm for time such as approximately 60 s, and then dried. Subsequently, the dried layer may then be rubbed by a soft cloth. In a non-limiting example, the soft cloth may be velvet.

Photo-alignment may be another technique for producing alignment layers upon liquid crystal enclosures. In some exemplary embodiments, photo-alignment may be desirable due to its non-contact nature and the capability of large scale fabrication. In a non-limiting example, the photo-alignment layer used in the liquid crystal variable optic portion may be comprised of a dichroic azobenzene dye (azo dye) capable of aligning predominantly in the direction perpendicular to the polarization of linear polarized light of typically UV wavelengths. Such alignment may be a result of repetitive trans-cis-trans photoisomerization processes.

As an example, PAAD series azobenzene dyes may be spin coated from a 1 wt. % solution in DMF at 3000 rpm for 30 s. Subsequently, the obtained layer may be exposed to a linear polarized light beam of a UV wavelength (such as for example, 325 nm, 351 nm, 365 nm) or even a visible wavelength (400-500 nm). The source of the light may take various forms. In some exemplary embodiments, light may originate from laser sources for example. Other light sources such as LEDs, halogen and incandescent sources may be other non-limiting examples. Either before or after the various forms of light are polarized in the various patterns as appropriate, the light may be collimated in various manners such as through the use of optical lensing devices. Light from a laser source may inherently have a degree of collimation, for example.

A large variety of photoanisotropic materials are known currently, based on azobenzene polymers, polyesthers, photo-crosslinkable polymer liquid crystals with mesogenic 4-(4-methoxycinnamoyloxy)biphenyl side groups and the like. Examples of such materials include sulfonic bisazodye SD1 and other azobenzene dyes, particularly, PAAD-series materials available from BEAM Engineering for Advanced Measurements Co. (BEAMCO), Poly(vinyl cinnamates), and others.

In some exemplary embodiments, it may be desirable to use water or alcohol solutions of PAAD series azo dyes. Some azobenzene dyes, for example, Methyl Red, may be used for photoalignment by directly doping a liquid crystal layer. Exposure of the azobenzene dye to a polarized light may cause diffusion and adhesion of the azo dyes to and within the bulk of the liquid crystal layer to the boundary layers creating desired alignment conditions.

Azobenzene dyes such as Methyl Red may also be used in combination with a polymer, for example, PVA. Other photoanisotropic materials capable of enforcing alignment of adjacent layers of liquid crystals may be acceptable are known currently. These examples may include materials based on coumarines, polyesthers, photo-crosslinkable polymer liquid crystals with mesogenic 4-(4-methoxycinnamoyloxy)-biphenyl side groups, poly(vinyl cinnamates), and others. The photo-alignment technology may be advantageous for embodiments comprising patterned orientation of liquid crystal.

In another exemplary embodiment of producing alignment layers, the alignment layer may be obtained by vacuum deposition of silicon oxide (SiOx where $1<=x<=2$) on the insert piece substrates. For example, $SiO_2$ may be deposited at low pressure such as $\sim 10^{-6}$ mbar. It may be possible to provide alignment features at a nanoscaled size that are injection molded into with the creation of the front and back insert pieces. These molded features may be coated in various manners with the materials that have been mentioned or other materials that may directly interact with physical alignment features and transmit the alignment patterning into alignment orientation of liquid crystal molecules.

Ion-beam alignment may be another technique for producing alignment layers upon liquid crystal enclosures. In some exemplary embodiments, a collimated argon ion or focused gallium ion beam may be bombarded upon the alignment layer at a defined angle/orientation. This type of alignment may also be used to align silicon oxide, diamond-like-carbon (DLC), polyimide and other alignment materials.

Still further exemplary embodiments may relate to the creation of physical alignment features to the insert pieces after they are formed. Rubbing techniques as are common in other liquid crystal based art may be performed upon the molded surfaces to create physical grooves. The surfaces may also be subjected to a post-molding embossing process to create small grooved features upon them. Still further embodiments may derive from the use of etching techniques which may involve optical patterning processes of various kinds.

Dielectric Materials

Dielectric films and dielectrics are described herein. By way of non-limiting examples, the dielectric film or dielectrics used in the liquid crystal variable optic portion possess characteristics appropriate to the invention described herein. A dielectric may comprise one or more material layers functioning alone or together as a dielectric. Multiple layers may be used to achieve dielectric performance superior to that of a single dielectric.

The dielectric may permit a defect-free insulating layer at a thickness desired for the discretely variable optic portion, for example, between 1 and 10 µm. A defect may be referred to as a pinhole, as is known by those skilled in the art to be a hole in the dielectric permitting electrical and/or chemical contact through the dielectric. The dielectric, at a given thickness, may meet requirements for breakdown voltage, for example, that the dielectric should withstand 100 volts or more.

The dielectric may allow for fabrication onto curved, conical, spherical, and complex three-dimensional surfaces (e.g., curved surfaces or non-planar surfaces). Typical methods of dip- and spin-coating may be used, or other methods may be employed.

The dielectric may resist damage from chemicals in the variable optic portion, for example the liquid crystal or liquid crystal mixture, solvents, acids, and bases or other materials that may be present in the formation of the liquid crystal region. The dielectric may resist damage from infrared, ultraviolet, and visible light. Undesirable damage may include degradation to parameters described herein, for example, breakdown voltage and optical transmission. The dielectric may resist permeation of ions. The dielectric may prevent electromigration, dendrite growth, and other degradations of the underlying electrodes. The dielectric may adhere to an underlying electrode and/or substrate, for example, with the use of an adhesion promotion layer. The dielectric may be fabricated using a process which allows for low contamination, low surface defects, conformal coating, and low surface roughness.

The dielectric may possess relative permittivity or a dielectric constant which is compatible with electrical operation of the system, for example, a low relative permittivity to reduce capacitance for a given electrode area. The dielectric may possess high resistivity, thereby permitting a very small current to flow even with high applied voltage. The dielectric may possess qualities desired for an optic device, for example, high transmission, low dispersion, and refractive index within a certain range. Example, non-limiting, dielectric materials, include one or more of Parylene-C, Parylene-HT, Silicon Dioxide, Silicon Nitride, and Teflon AF.

Electrode Materials

Electrodes are described herein for applying an electric potential for achieving an electric field across the liquid crystal region. An electrode generally comprises one or more material layers functioning alone or together as an electrode.

The electrode may adhere to an underlying substrate, dielectric coating, or other objects in the system, perhaps with the use of an adhesion promoter (e.g., methacryloxypropyltrimethoxysilane). The electrode may form a beneficial native oxide or be processed to create a beneficial oxide layer. The electrode may be transparent, substantially transparent or opaque, with high optical transmission and little reflection. The electrode may be patterned or etched with known processing methods. For example, the electrodes may be evaporated, sputtered, or electroplated, using photolithographic patterning and/or lift-off processes.

The electrode may be designed to have suitable resistivity for use in the electrical system described herein, for example, meeting the requirements for resistance in a given geometric construct.

The electrodes may be manufactured from one or more of indium tin oxide (ITO), aluminum doped zinc oxide (AZO), gold, stainless steel, chrome, graphene, graphene doped layers and aluminum. It will be appreciated that this is not an exhaustive list.

The electrodes may be used to establish an electric field in a region between the electrodes. In some exemplary embodiments, there may be numerous surfaces upon which electrodes may be formed. It may be possible to place electrodes on any or all of the surfaces that are defined, and an electric field may be established in the region between any of the surfaces upon which electrodes have been formed by application of electric potential to at least those two surfaces.

Processes

The following method steps are provided as examples of processes that may be implemented according to some aspects of the present invention. It should be understood that the order in which the method steps are presented is not meant to be limiting and other orders may be used to implement the invention. In addition, not all of the steps are required to implement the present invention and additional steps may be included in various exemplary embodiments of the present invention. It may be obvious to one skilled in the art that additional embodiments may be practical, and such methods are well within the scope of the claims.

Figure 7:
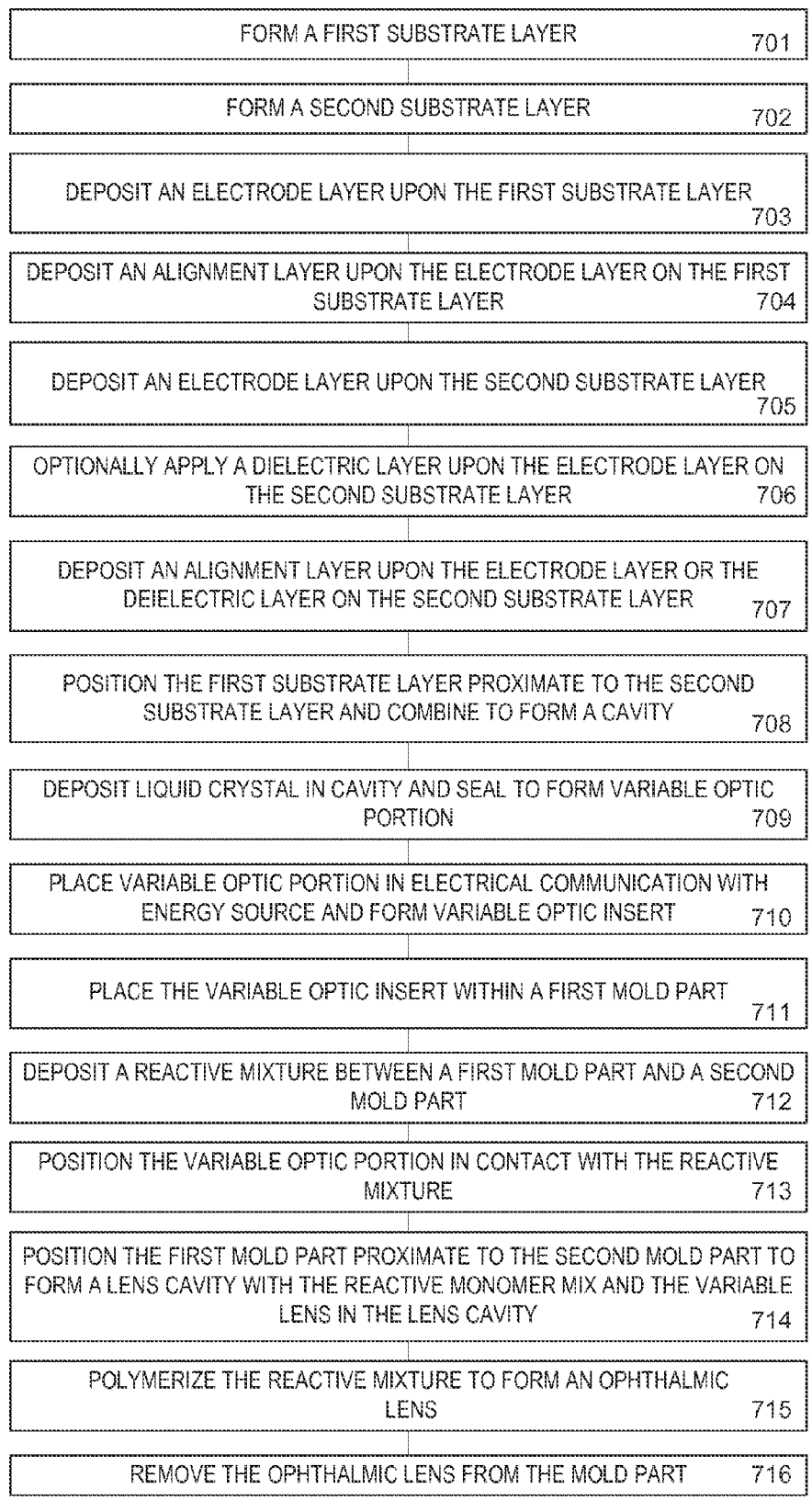
FIG. 7 illustrates the method steps for forming an ophthalmic lens with a variable optic insert which may be comprised of polymer networked regions of interstitially located liquid crystal.

Referring to FIG. 7, a flowchart illustrates exemplary steps that may be used to implement the present invention. At 701, a first substrate layer is formed which may comprise a back curve surface and have a top surface with a shape of a first type that may differ from the shape of surface of other substrate layers. In some exemplary embodiments, the difference may include a different radius of curvature of the surface at least in a portion that may reside in the optical zone. At 702, a second substrate layer is formed which may comprise a front curve surface or an intermediate surface or a portion of an intermediate surface for more complicated devices. At 703, an electrode layer may be deposited upon the first substrate layer. The deposition may occur, for example, by vapor deposition or electroplating. In some exemplary embodiments, the first substrate layer may be part of an insert that has regions both in the optical zone and regions in the non-optic zone. The electrode deposition process may simultaneously define interconnect features in some embodiments. In some exemplary embodiments a dielectric layer may be formed upon the interconnects or electrodes. The dielectric layer may comprise numerous insulating and dielectric layers such as for example silicon dioxide.

At 704, the first substrate layer may be further processed to add an alignment layer upon the previously deposited dielectric or electrode layer. The alignment layers may be deposited upon the top layer on the substrate and then processed in standard manners, for example, rubbing techniques, to create the grooving features that are characteristic of standard alignment layers or by treatment with exposure to energetic particles or light. Thin layers of photoanisotropic materials may be processed with light exposure to form alignment layers with various characteristics. As mentioned previously, in methods to form layers of liquid crystal wherein polymer networked regions of interstitially located liquid crystal are formed, the methods may not include steps related to the formation of alignment layers.

At 705, the second substrate layer may be further processed. An electrode layer may be deposited upon the second substrate layer in an analogous fashion to step 703. Then in some exemplary embodiments, at 706, a dielectric layer may be applied upon the second substrate layer upon the electrode layer. The dielectric layer may be formed to have a variable thickness across its surface. As an example, the dielectric layer may be molded upon the first substrate layer. Alternatively, a previously formed dielectric layer may be adhered upon the electrode surface of the second substrate piece.

At 707, an alignment layer may be formed upon the second substrate layer in similar fashion to the processing step at 704. After 707, two separate substrate layers that may form at least a portion of an ophthalmic lens insert may be ready to be joined. In some exemplary embodiments at 708, the two pieces will be brought in close proximity to each other and then liquid crystal material may be filled in between the pieces. There may be numerous manners to fill the liquid crystal in between the pieces including as non-limiting examples, vacuum based filling where the cavity is evacuated and liquid crystal material is subsequently allowed to flow into the evacuated space. In addition, the capillary forces that are present in the space between the lens insert pieces may aid in the filling of the space with liquid crystal material. At 709, the two pieces may be brought adjacent to each other and then sealed to form a variable optic element with liquid crystal. There may be numerous manners of sealing the pieces together including the use of adhesives, sealants, and physical sealing components such as o-rings and snap lock features as non-limiting examples.

In some exemplary embodiments, two pieces of the type formed at 709 may be created by repeating method steps 701 to 709 wherein the alignment layers are offset from each other to allow for a lens that may adjust the focal power of non-polarized light. In such exemplary embodiments, the two variable optic layers may be combined to form a single variable optic insert. At 710, the variable optic portion may be connected to the energy source and intermediate or attached components may be placed thereon.

At 711, the variable optic insert resulting at step 710 may be placed within a mold part. The variable optic insert may or may not also comprise one or more components. In some preferred embodiments, the variable optic insert is placed in the mold part via mechanical placement. Mechanical placement may include, for example, a robot or other automation, such as that known in the industry to place surface-mount components. Human placement of a variable optic insert is also within the scope of the present invention. Accordingly, any mechanical placement or automation may be utilized which is effective to place a variable optic insert with an energy source within a cast mold part such that the polymerization of a reactive mixture contained by the mold part will include the variable optic in a resultant ophthalmic lens.

In some exemplary embodiments, a variable optic insert may be placed in a mold part attached to a substrate. An energy source and one or more components may also be attached to the substrate and may be in electrical communication with the variable optic insert. Components may include, for example, circuitry to control power applied to the variable optic insert. Accordingly, in some exemplary embodiments a component includes a control mechanism for actuating the variable optic insert to change one or more optical characteristics, for example, a change of state between a first optical power and a second optical power.

In some exemplary embodiments, a processor device, microelectromechanical system (MEMS), nanoelectromechanical system (NEMS) or other component may also be placed into the variable optic insert and in electrical contact with the energy source. At 712, a reactive monomer mixture may be deposited into a mold part. At 713, the variable optic insert may be positioned into contact with the reactive mixture. In some exemplary embodiments the order of placement of variable optic and depositing of monomer mixture may be reversed. At 714, the first mold part is placed proximate to a second mold part to form a lens-forming cavity with at least some of the reactive monomer mixture and the variable optic insert in the cavity. As discussed above, preferred embodiments include an energy source and one or more components also within the cavity and in electrical communication with the variable optic insert.

At 715, the reactive monomer mixture within the cavity is polymerized. Polymerization may be accomplished, for example, via exposure to one or both of actinic radiation and heat. At 716, the ophthalmic lens is removed from the mold parts with the variable optic insert adhered to or encapsulated within the insert-encapsulating polymerized material making up the ophthalmic lens.

Although the invention herein may be used to provide hard or soft contact lenses made of any known lens material, or material suitable for manufacturing such lenses, preferably, the lenses of the invention are soft contact lenses having water contents of about 0 to about 90 percent. More preferably, the lenses are made of monomers containing hydroxy groups, carboxyl groups, or both or be made from silicone-containing polymers, such as siloxanes, hydrogels, silicone hydrogels, and combinations thereof. Material useful for forming the lenses of the invention may be made by reacting blends of macromers, monomers, and combinations thereof along with additives such as polymerization initiators. Suitable materials include, without limitation, silicone hydrogels made from silicone macromers and hydrophilic monomers.

Apparatus

Figure 8:
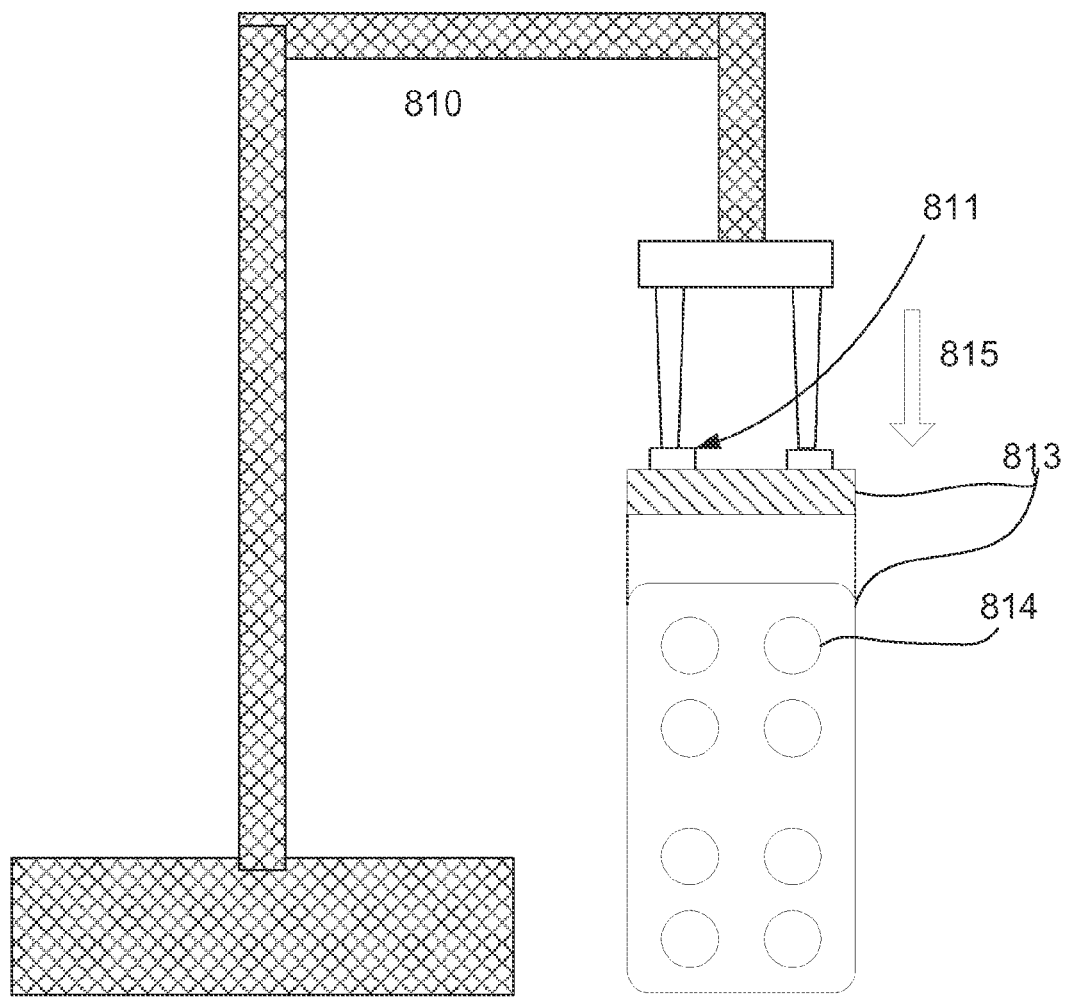
FIG. 8 illustrates an example of apparatus components for placing a variable optic insert comprised of polymer networked regions of interstitially located liquid crystal into an ophthalmic lens mold part.

Referring now to FIG. 8, automated apparatus 810 is illustrated with one or more transfer interfaces 811. Multiple mold parts, each with an associated variable optic insert 814 are contained on a pallet 813 and presented to transfer interfaces 811. Exemplary embodiments, may include, for example a single interface individually placing variable optic insert 814, or multiple interfaces (not shown) simultaneously placing variable optic inserts 814 into the multiple mold parts, and in some exemplary embodiments, in each mold part. Placement may occur via vertical movement 815 of the transfer interfaces 811.

Another aspect of some exemplary embodiments of the present invention includes an apparatus to support the variable optic insert 814 while the body of the ophthalmic lens is molded around these components. In some exemplary embodiments the variable optic insert 814 and an energy source may be affixed to holding points in a lens mold (not illustrated). The holding points may be affixed with polymerized material of the same type that will be formed into the lens body. Other exemplary embodiments include a layer of pre-polymer within the mold part onto which the variable optic insert 814 and an energy source may be affixed.

Processors Included in Insert Devices

Figure 9:
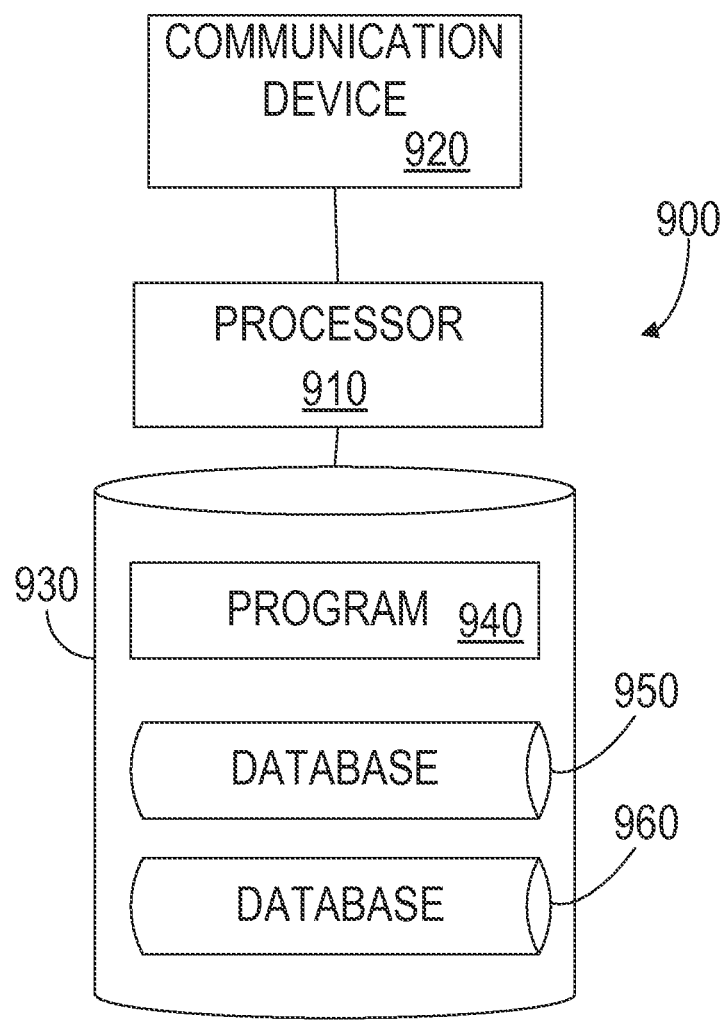
FIG. 9 illustrates a processor that may be used to implement some exemplary embodiments of the present invention.

Referring now to FIG. 9, a controller 900 is illustrated that may be used in some exemplary embodiments of the present invention. The controller 900 includes a processor 910, which may include one or more processor components coupled to a communication device 920. In some exemplary embodiments, a controller 900 may be used to transmit energy to the energy source placed in the ophthalmic lens.

The controller may include one or more processors, coupled to a communication device configured to communicate energy via a communication channel. The communication device may be used to electronically control one or more of the placement of a variable optic insert into the ophthalmic lens or the transfer of a command to operate a variable optic device.

The communication device 920 may also be used to communicate, for example, with one or more controller apparatus or manufacturing equipment components.

The processor 910 is also in communication with a storage device 930. The storage device 930 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices. The storage device 930 may store a program 940 for controlling the processor 910.

The processor 910 performs instructions of the program 940, and thereby operates in accordance with the present invention. For example, the processor 910 may receive information descriptive of variable optic insert placement, processing device placement, and the like. The storage device 930 may also store ophthalmic related data in one or more databases 950, 960. The database 950 and 960 may include specific control logic for controlling energy to and from a variable optic lens.

Liquid Crystal Devices Comprising Layers of Shaped Regions of Polymer Networked Regions of Interstitially Located Liquid Crystal Referring to FIG. 10A, an alternative of a variable optic insert 1000 that may be inserted into an ophthalmic lens is illustrated with a liquid crystal layer comprising polymerized regions 1035 and interstitially located liquid crystal 1030. Each of the aspects of the various elements that may be defined around the liquid crystal region may have similar diversity as described in relation to the variable optic insert in FIG. 10A. Therefore, there may be a front optic element 1010 and a back optic element 1045 where in some embodiments these optic elements may have one or more of electrodes 1020 and 1040, dielectric layers and alignment layers for example upon them.

Referring to FIG. 10B, an electro-potential may be applied across the electrodes resulting in the establishment of an electric field, illustrated at 1090. When the field is established of sufficient strength it may cause the interstitially located liquid crystal material to reorientate and align with the electric field. This effect is illustrated by the exemplary alignment of the liquid crystal molecules as depicted at 1060.

Referring to FIG. 11A, a global pattern in the location of networked regions of liquid crystal material may be observed as may be illustrated by the dashed line 1105. There may be a front optic element 1110 and a back optic element 1140 that may also support electrodes, dielectric layers and alignment layers in the various manners as have been described. Between the front optic element 1110 and the back optic element 1140 may be located a polymerized region that may be itself comprised of portions with different characteristics. The polymerized region around 1120 may be formed in such a manner as to be devoid or relatively devoid of liquid crystal whereas networked regions of liquid crystal material such as 1130 may form in other locations. A shaped profile of the networked region, as illustrated by a border at 1105, may define additional means to form devices using a liquid crystal layer of a variable optic insert. Optical radiation that traverses the liquid crystal layer will have the accumulated effect of the effective thickness of the networked regions that it interacts with. Thus, portions of the layer that present a higher effective thickness to light of liquid crystal in networked regions will have a higher effective index of refraction to the light. Referring to FIG. 11B, the liquid crystal molecules may be interstitially located in a polymerized network and in some exemplary embodiments may be formed in a layer where the polymer backbone of the network may also contain oriented liquid crystal regions that may orient the free interstitially located liquid crystal. As shown at 1150, the liquid crystal may be oriented by the polymer network. Proceeding to FIG. 11C, the application of an electric field 1170 by the application of an electropotential to electrodes on both sides of the liquid crystal layer may result in alignment of the liquid crystal molecules within the networked regions as illustrated in the example of item 1160. This alignment will result in a change of the effective index of refraction that a light beam in the vicinity of a networked region will perceive networked regions with liquid crystal molecules.

Shaped Layers of Polymerized Liquid Crystal

In some of the exemplary embodiments that have been described, insert pieces may have a characteristic curvature of their surfaces. In some embodiments, the curvature may be the same or similar and in other exemplary embodiments the curvature may differ between some or all of the insert piece surfaces. The configuration of the insert pieces may form regions between the pieces that create a space where various elements described herein may be located, such as electrode layers, alignment layers and liquid crystal layers. The space between the insert pieces may create a chamber in which a layer of liquid crystal material may be filled and in some exemplary embodiments contained.

In the present invention, a liquid crystal layer may be polymerized in manners discussed and therefore may create its own degree of containment. The polymerized layer may be formed within the aforementioned chamber in some exemplary embodiments. In other exemplary embodiments a first insert piece and a second insert piece may have a polymerized liquid crystal layer between them wherein the polymerized liquid crystal layer creates its own containment.

In still further exemplary embodiments, it may be possible to create a curved layer of polymerized liquid crystal material that after processing exists in its own hardened form and no longer is attached to insert pieces or to molding pieces that may have been useful to form the material into the curved layer. The resulting isolated curved layer of polymerized liquid crystal material may thereafter have surfaces upon which much of the additional processing described herein may be performed. For example, electrodes may be formed upon one or both surfaces on a polymerized liquid crystal layer much as they may be formed upon insert pieces. In some exemplary embodiments, alignment layers may be formed upon the resulting isolated curved layer of polymerized liquid crystal material. In some other embodiments, alignment layers may have been present and patterned upon either the insert pieces or mold pieces that were used to create the polymerized piece. These alignment layers present on insert pieces or mold pieces may impart the defined orientation of liquid crystal polymer materials as discussed previously. In the process used to remove the insert pieces or mold pieces to isolate the curved polymerized liquid crystal layer, the alignment layer may be removed in some embodiments or may remain upon the polymerized piece in part or whole in others.

The resulting entity created by forming an isolated piece with one or more curved liquid crystal layers may be treated in manners equivalent to an insert device to form ophthalmic devices as discussed herein.

In this description, reference has been made to elements illustrated in the figures. Many of the elements are depicted for reference to depict the exemplary embodiments of the inventive art for understanding. The relative scale of actual features may be significantly different from that as depicted, and variation from the depicted relative scales should be assumed within the spirit of the art herein. For example, liquid crystal molecules may be of a scale to be impossibly small to depict against the scale of insert pieces. The depiction of features that represent liquid crystal molecules at a similar scale to insert pieces to allow for representation of factors such as the alignment of the molecules is therefore such an example of a depicted scale that in actual embodiments may assume much different relative scale.

Although shown and described in what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be constructed to cohere with all modifications that may fall within the scope of the appended claims.

The invention claimed is:

1. An ophthalmic lens device with a variable optic insert positioned within at least a portion of the optical zone of the ophthalmic lens device, wherein the variable optic insert comprises:
 a curved front surface and a curved back surface wherein the front surface and the back surface are configured to bound at least a portion of one chamber;
 an energy source embedded in the variable optic insert in at least a region comprising a non-optical zone; and
 a layer containing liquid crystal material positioned within the at least one chamber, wherein the layer includes polymer networked regions of interstitially located liquid crystal material.

2. The ophthalmic lens device of claim 1, wherein the polymer network comprises chemically attached liquid crystal molecules.

3. The ophthalmic lens device of claim 2 wherein within the layer comprised of polymer networked regions of liquid crystal material, the region comprising the liquid crystal in interstitial network locations is a subset of the layer between the curved front surface and the curved back surface and has a shaped profile capable of causing an optical effect supplementary to the effect of the curved surfaces.

4. The ophthalmic lens device of claim 2 wherein the lens is a Contact lens.

5. The ophthalmic lens device of claim 4, further comprising:
 a first layer of electrode material proximate to the curved back surface; and
a second layer of electrode material proximate to the curved front surface.

6. The ophthalmic lens device of claim 5, wherein the layer of liquid crystal material varies its index of refraction affecting a ray of light traversing the layer of liquid crystal material when an electric potential is applied across the first layer of electrode material and the second layer of electrode material.

7. The ophthalmic lens device of claim 6, wherein the variable optic insert alters a focal characteristic of the lens.

8. The ophthalmic lens device of claim 7, further comprising an electrical circuit, wherein the electrical circuit controls the flow of electrical energy from the energy source to the first and second electrode layers.

9. The ophthalmic lens device of claim 8, wherein the electrical circuit comprises a processor.

10. An ophthalmic lens device with a variable optic insert positioned within at least a portion of the optical zone of the ophthalmic lens device, wherein the variable optic insert comprises:
 a curved first front surface and a curved first back surface wherein the first front surface and the first back surface are configured to bound at least a portion of a first chamber;
 a curved second front surface and a curved second back surface wherein the second front surface and the second back surface are configured to bound at least a portion of a second chamber;
 a layer containing liquid crystal material positioned within at least one of the first chamber and the second chamber, wherein the layer is comprised of polymer networked regions of interstitially located liquid crystal material; and
 an energy source embedded in the insert in at least a region comprising a non-optical zone.

11. The ophthalmic lens device of claim 10, wherein the polymer network comprises chemically attached liquid crystal molecules.

12. The ophthalmic lens device of claim 11 wherein within the layer comprised of polymer networked regions of liquid crystal material, the region comprising the liquid crystal in interstitial network locations is a subset of the layer between the curved front surface and the curved back surface and has a shaped profile capable of causing an optical effect supplementary to the effect of the curved surfaces.

13. The ophthalmic lens device of claim 10, wherein the lens is a contact lens.

14. The ophthalmic lens device of claim 13 further comprising:
 a first layer of electrode material proximate to the curved back surface; and
 a second layer of electrode material proximate to the curved front surface.

15. The ophthalmic lens device of claim 14, wherein the layer of liquid crystal material varies its index of refraction affecting a ray of light traversing the layer of liquid crystal material when an electric potential is applied across the first layer of electrode material and the second layer of electrode material.

16. The ophthalmic lens device of claim 15, wherein the variable optic insert alters a focal characteristic of the lens.

17. The ophthalmic lens device of claim 16, further comprising an electrical circuit, wherein the electrical circuit controls the flow of electrical energy from the energy source to the first and second electrode layers.

18. The ophthalmic lens device of claim 17, wherein the electrical circuit comprises a processor.

19. A contact lens device with a variable optic insert positioned within at least a portion of the optical zone of the contact lens device, wherein the variable optic insert comprises:
 a curved first front surface and a curved first back surface wherein the first front surface and the first back surface are configured to form at least a first chamber;
 a first layer of electrode material proximate to the curved first front surface;
 a second layer of electrode material proximate to the curved first back surface;
 a first layer containing liquid crystal material positioned within the first chamber, wherein the first layer is comprised of polymer networked regions of interstitially located liquid crystal material, wherein the polymer network comprises chemically attached liquid crystal molecules, and wherein the first layer of liquid crystal material varies its index of refraction affecting a ray of light traversing the first layer of liquid crystal material when an electric potential is applied across the first layer of electrode material and the second layer of electrode material;
 a curved second front surface and a curved second back surface wherein the second front surface and the second back surface are configured to form at least a second chamber;
 a third layer of electrode material proximate to the curved second front surface;
 a fourth layer of electrode material proximate to the curved second back surface;
 a second layer containing liquid crystal material positioned within the second chamber, wherein the second layer is comprised of polymer networked regions of interstitially located liquid crystal material, wherein the polymer network comprises chemically attached liquid crystal molecules, and wherein the second layer of liquid crystal material varies its index of refraction affecting a ray of light traversing the first layer of liquid crystal material when an electric potential is applied across the third layer of electrode material and the forth layer of electrode material;

an energy source embedded in the insert in at least a region comprising a non-optical zone;

an electrical circuit comprising a processor, wherein the electrical circuit controls the flow of electrical energy from the energy source to one or more of the first, second, third or fourth electrode layers; and wherein the variable optic insert alters a focal characteristic of the ophthalmic lens.

20. A contact lens device with a variable optic insert positioned within at least a portion of the optical zone of the contact lens device, wherein the variable optic insert comprises a layer containing liquid crystal material positioned within the variable optic insert, wherein the layer is comprised of polymer networked regions of interstitially located liquid crystal material, wherein at least a first surface of the layer is curved.

21. An ophthalmic lens device with a variable optic insert positioned within at least a portion of the optical zone of the ophthalmic lens device, wherein the variable optic insert comprises:

an insert front curve piece and an insert back curve piece, wherein a back surface of the front curve piece has a first curvature and a front surface of the back curve piece has a second curvature;

an energy source embedded in the insert in at least a region comprising the non-optical zone; and a layer containing liquid crystal material, wherein the layer is comprised of polymer networked regions of interstitially located liquid crystal material.

22. The ophthalmic lens device of claim 21, wherein the polymer network comprises chemically attached liquid crystal molecules.

23. The ophthalmic lens device of claim 22, wherein within the layer comprised of polymer networked regions of liquid crystal material, the region comprising the liquid crystal in interstitial network locations is a subset of the layer between optic pieces and has a shaped profile capable of causing an optical effect supplementary to the effect of the curvature of the surfaces.

24. The ophthalmic lens device of claim 21, wherein the first curvature is different from the second curvature.

25. The ophthalmic lens device of claim 21, wherein the lens is a Contact lens.

26. The ophthalmic lens device of claim 25, further comprising:

a first layer of electrode material proximate to the back surface of the front curve piece; and a second layer of electrode material proximate to the front surface of the back curve piece.

27. The ophthalmic lens device of claim 26, wherein the layer of liquid crystal material varies its index of refraction affecting a ray of light traversing the layer of liquid crystal material when an electric potential is applied across the first layer of electrode material and the second layer of electrode material.

28. The ophthalmic lens device of claim 27, wherein the variable optic insert alters a focal characteristic of the lens.

29. The ophthalmic lens device of claim 28, further comprising an electrical circuit, wherein the electrical circuit controls the flow of electrical energy from the energy source to the first and second electrode layers.

30. The ophthalmic lens device of claim 29 wherein the electrical circuit comprises a processor.

31. An ophthalmic lens device with a variable optic insert positioned within at least a portion of the optical zone of the ophthalmic lens device, wherein the variable optic insert comprises:

an insert front curve piece, at least a first intermediate curve piece and an insert back curve piece, wherein a back surface of the front curve piece has a first curvature and a front surface of the first intermediate curve piece has a second curvature;

an energy source embedded in the insert in at least a region comprising the non-optical zone; and the variable optic insert comprising a layer containing liquid crystal material, wherein the layer is comprised of polymer networked regions of interstitially located liquid crystal material.

32. The ophthalmic lens device of claim 31, wherein the polymer network comprises chemically attached liquid crystal molecules.

33. The ophthalmic lens device of claim 32, wherein the first curvature is different from the second curvature.

34. The ophthalmic lens device of claim 31, wherein the lens is a contact lens.

35. The ophthalmic lens device of claim 34, further comprising:

a first layer of electrode material proximate to the front curve piece; and a second layer of electrode material proximate to one or more of the intermediate curve piece and the back curve piece.

36. The ophthalmic lens device of claim 34, further comprising:

a first layer of electrode material proximate to the front curve piece; and a second layer of electrode material proximate to the intermediate curve piece.

37. The ophthalmic lens device of claim 36, wherein the layer of liquid crystal material varies its index of refraction affecting a ray of light traversing the layer of liquid crystal material when an electric potential is applied across the first layer of electrode material and the second layer of electrode material.

38. The ophthalmic lens device of claim 37, wherein the variable optic insert alters a focal characteristic of the lens.

39. The ophthalmic lens device of claim 38, further comprising an electrical circuit, wherein the electrical circuit controls the flow of electrical energy from the energy source to the first and second electrode layers.

40. The ophthalmic lens device of claim 39 wherein the electrical circuit comprises a processor.

* * * * *